(12) United States Patent
Yamanishi et al.

(10) Patent No.: US 8,033,569 B2
(45) Date of Patent: Oct. 11, 2011

(54) INTERIOR STRUCTURE OF VEHICLE EQUIPPED WITH CURTAIN AIRBAG

(75) Inventors: Mitsutoshi Yamanishi, Hiroshima (JP); Fumio Amano, Hiroshima (JP)

(73) Assignee: Mazda Motor Corporation (JP)

( * ) Notice: Subject to any disclaimer, the term of this patent is extended or adjusted under 35 U.S.C. 154(b) by 133 days.

(21) Appl. No.: 12/480,178

(22) Filed: Jun. 8, 2009

(65) Prior Publication Data
US 2010/0032928 A1 Feb. 11, 2010

(30) Foreign Application Priority Data

| Aug. 8, 2008 | (JP) | 2008-205046 |
| Aug. 19, 2008 | (JP) | 2008-210271 |
| Sep. 17, 2008 | (JP) | 2008-237295 |
| Sep. 30, 2008 | (JP) | 2008-252039 |

(51) Int. Cl.
*B60R 21/213* (2006.01)
*B60R 21/232* (2006.01)
*B60R 21/2338* (2006.01)

(52) U.S. Cl. ............................. 280/730.2; 280/728.2

(58) Field of Classification Search .............. 280/728.2, 280/728.3, 730.2, 733, 743.1, 743.2
See application file for complete search history.

(56) References Cited

U.S. PATENT DOCUMENTS

| 6,113,132 | A  | * | 9/2000 | Saslecov | 280/730.1 |
| 6,224,091 | B1 | * | 5/2001 | Eyrainer et al. | 280/730.2 |
| 6,237,942 | B1 | * | 5/2001 | Swann | 280/730.2 |
| 6,338,498 | B1 | * | 1/2002 | Niederman et al. | 280/728.2 |
| 6,367,836 | B1 | * | 4/2002 | Tanase et al. | 280/730.2 |
| 6,431,590 | B1 | * | 8/2002 | Bakhsh et al. | 280/730.2 |
| 6,450,529 | B1 | * | 9/2002 | Kalandek et al. | 280/730.2 |
| 6,494,486 | B2 | * | 12/2002 | Pausch et al. | 280/743.2 |
| 6,588,796 | B2 | * | 7/2003 | Webber et al. | 280/737 |
| 6,663,141 | B2 | * | 12/2003 | Thomas et al. | 280/730.2 |
| 6,688,641 | B2 | * | 2/2004 | Dominissini | 280/730.2 |
| 6,695,342 | B2 | * | 2/2004 | Tanase et al. | 280/730.2 |
| 7,077,424 | B2 | * | 7/2006 | Inoue | 280/730.2 |
| 7,134,683 | B2 | * | 11/2006 | Bendig et al. | 280/730.1 |

(Continued)

FOREIGN PATENT DOCUMENTS

DE 20 2004 004 020 U1 7/2004

(Continued)

OTHER PUBLICATIONS

Extended European Search Report dated Oct. 28, 2009; Application No. 09009755.1-1264.

*Primary Examiner* — Paul N Dickson
*Assistant Examiner* — Laura Freedman
(74) *Attorney, Agent, or Firm* — Studebaker & Brackett PC; Donald R. Studebaker

(57) ABSTRACT

A curtain member has a bending portion which is formed by a rear portion of the curtain member in a folded stored state being bent forward, i.e., toward an opposite side to the vertically-extending vehicle-body pillar. A second tether member is made of a long cloth member. Its rear end is fixed to a specified lower-side position of a fifth pillar which is located below the middle portion of this pillar in the vertical direction via a fixing pin. Its front end is fixed to a body portion of a curtain member via a seam portion. Accordingly, there can be provided the interior structure of a vehicle equipped with a curtain airbag which can properly form the tension line at the curtain member.

4 Claims, 30 Drawing Sheets

U.S. PATENT DOCUMENTS

| | | | |
|---|---|---|---|
| 7,165,783 B2 * | 1/2007 | Karlbauer et al. | 280/730.2 |
| 7,172,212 B2 * | 2/2007 | Aoki et al. | 280/730.2 |
| 7,380,815 B2 * | 6/2008 | Rose et al. | 280/730.2 |
| 7,520,527 B2 * | 4/2009 | Yamagiwa et al. | 280/730.2 |
| 7,625,005 B2 * | 12/2009 | Saberan et al. | 280/730.2 |
| 7,661,701 B2 * | 2/2010 | Hirata | 280/730.2 |
| 7,703,798 B2 * | 4/2010 | Yamagiwa et al. | 280/728.2 |
| 7,780,190 B2 * | 8/2010 | Yamagiwa et al. | 280/730.2 |
| 7,878,530 B2 * | 2/2011 | Mizuno et al. | 280/730.1 |
| 2002/0070537 A1 * | 6/2002 | Webber et al. | 280/730.2 |

FOREIGN PATENT DOCUMENTS

| | | |
|---|---|---|
| EP | 1386791 A2 | 2/2004 |
| EP | 1 607 276 A | 12/2005 |
| JP | 2006 151390 A | 6/2006 |
| JP | 2007-015536 A | 1/2007 |
| WO | 2005 118350 A | 12/2005 |

* cited by examiner

Vehicle Foreword

Vehicle Forward

Vehicle Outward  FIG. 3

Vehicle Outward

← Vehicle Forward

Vehicle Forward

Vehicle Forward

Vehicle Forward

Vehicle Outward

← Vehicle Forward

Vehicle Outward

Vehicle Outward

Vehicle Forward

INTERIOR STRUCTURE OF VEHICLE EQUIPPED WITH CURTAIN AIRBAG

BACKGROUND OF THE INVENTION

The present invention relates to an interior structure of a vehicle equipped with a curtain airbag, and, in particular, relates to an interior structure of a vehicle equipped with a curtain airbag which is disposed inside a roof trim in a stored state.

Conventionally, a curtain airbag device equipped with an airbag which inflates downward from the ceiling portion into the vehicle compartment in a curtain shape (hereinafter, referred to as a "curtain member") at a vehicle side collision or rollover is known. This curtain airbag device is configured to reduce the collision impact at the vehicle side collision or to cover a side window for protection of passengers at the vehicle rollover.

Japanese Patent Laid-Open Publication No. 2007-15536, for example, discloses the curtain airbag device in which the curtain member in the stored state is provided inside the roof trim at a roof side rail portion. According to this curtain airbag device, the volume of part of the end portion of the curtain member which is stored inside the pillar trim is set to be so less than the volume of that which is pulled back at the time of inflation that the inflation function of the curtain member can be properly ensured, reducing the degree of projection of the roof trim into the vehicle compartment when the curtain member is stored.

Herein, it may be considered that the curtain member is stored in such a manner that a side end portion (an end portion in a vehicle longitudinal direction) of the curtain member is turned back (bent), i.e., the curtain member has a bending portion. Thereby, when the curtain member inflates, the roof trim may be deformed and the pillar portion which is located forward or rearward may be covered properly with this side end portion (bending portion) of the curtain member which inflates into the vehicle compartment. Thus, the large inflation range of the curtain member can be ensured, thereby improving the safety against the vehicle collision, keeping an outlet opening of the curtain member at an interior member as smaller as possible.

Herein, however, fixing of the curtain member to the vehicle body is only conducted at the upper portion of the roof side rail portion, not at a pillar portion which is provided in fort or back of that, so a so-called "tension line" which should be formed so as to extend in the vehicle longitudinal direction by connecting a fixing point of the front end of the vehicle body (a front pillar) and a fixing point of the rear end of the vehicle body (a rear pillar) may not be formed properly. If this tension line is not formed at the curtain member, there is a concern that the curtain member may not keep its inflating state properly covering the side window.

Further, EP 1386791 A2 discloses the airbag device in which the curtain member in the stored state is disposed at the upper edge portion of the back window at the vehicle rear portion. This curtain member inflates downward so as to cover the back window from the inside of the vehicle compartment when the rear impact is detected. Further, this publication also discloses the airbag device to guide the inflation direction of the curtain member with a pair of guide rails which are provided at both-side edge portions of an opening of the back (rear) window. Thus, the curtain member can be guided properly and cover the back (rear) window surely.

Herein, since the curtain member has a tension in the vehicle width direction by providing the guide rails, the above-described tension line can be formed in the vehicle width direction at the curtain member. However, there is a concern that according to the structure of the airbag device in the above-described European publication the curtain member may not inflate stably because the curtain member could not smoothly slide on the guide rails if the inflation speeds at the both sides of the curtain member are different from each other.

Accordingly, it may be considered as another structure for providing the tension line to the curtain member without any guide rail that the curtain member is directly fixed to the both-side edge portions of the opening of the back window so that the curtain member inflates from the both-side edge portions. Herein, it may be necessary that inner-wall faces (pillar trims) of the both-side edge portions should be deformed greatly or broken in this structure. However, this may be difficult because the pillar trim provided at the both-side edge portions of the opening is generally made of a hard material of synthetic resin so as to form a luggage-space wall face. Thus, there is a concern that the tension line may not be properly formed at the curtain member according to the present structure, either.

Meanwhile, in the curtain airbag device disclosed in the above-described Japanese patent publication, the curtain member is stored in such a manner that the side end portion of the curtain member is turned back, i.e., the curtain member has the bending portion, as described above. Accordingly, there is a concern that the inflation of the side end portion of the curtain member (i.e., the bending portion) toward the vehicle compartment may be improperly delayed, so that the safety against the vehicle collision would deteriorate.

SUMMARY OF THE INVENTION

The present invention has been devises in view of the above-described concerns, and an object of the present invention is to provide an interior structure of a vehicle equipped with a curtain airbag which can properly form the tension line at the curtain member or make the side end portion of the curtain member (i.e., the bending portion) inflate promptly.

According to the present invention, there is provided an interior structure of a vehicle equipped with a curtain airbag, comprising a roof trim provided to form a ceiling portion of a vehicle compartment below a roof panel, a pillar trim provided to cover a vehicle-body pillar from an inside of the vehicle compartment and extend vertically, the pillar trim being made from synthetic resin, a vehicle-body opening provided beside the vehicle-body pillar, an upper edge of which is positioned near an outer end portion of the roof trim, and a curtain-airbag means provided to be fixed to a vehicle body along the upper edge of the vehicle-body opening, the curtain-airbag means including a curtain member which has an inflatable portion to be inflated by gas supplied, the curtain member inflating into the vehicle compartment from a stored state thereof, deforming the roof trim, so as to cover the vehicle-body opening when the gas is supplied into the inflatable portion on a specified condition, wherein the curtain member has a bending portion near the vehicle-body pillar in the stored state, the bending portion being formed so as to bend toward a specified side, and there is provided a connecting member which connects a specified portion of the curtain member to a specified middle portion of the vehicle-body pillar or connects two separate specified portions of the curtain member.

According to the present invention, the tension line can be properly formed at the curtain member or the bending portion can be made inflate promptly.

According to an embodiment of the present invention, the bending portion bends toward an opposite side to the vehicle-body pillar or toward the vehicle compartment, and the connecting member connects the specified portion of the curtain member to a specified lower-side position of the vehicle-body pillar. Thereby, the connecting member generates the tension between the specified portion of the curtain member and the specified lower-side position of the vehicle-body pillar when the curtain member inflates at the vehicle-body opening. Thus, the tension line can be formed at the curtain member. Herein, the specified lower-side position of the vehicle-body pillar means any point in an area which is from the lower end of the vehicle-body pillar to the middle portion of the vehicle-body pillar in the vertical direction. Further, the connecting member may be made of any type of member, such as a band-shaped one, a triangle-shaped one, a string-shaped one, or a cloth part which is formed integrally with the curtain member.

According to another embodiment of the present invention, the specified portion of the curtain member to be connected by the connecting member is configured to be located on the opposite side to the vehicle-body pillar relative to a bend position of the bending portion of the curtain member when the curtain member inflates. Thereby, the connecting member is connected to the portion of the curtain member which can inflate faster than the bending portion does. Thus, the connecting member moves promptly, so that the connecting member can generate the tension quickly and surely. Accordingly, the tension producing function of the connecting member can be obtained quickly and surely.

According to another embodiment of the present invention, the specified portion of the curtain member is located near the bend position. Thereby, the connecting member connects to the portion of the curtain member which is the closest to the vehicle-body pillar. Accordingly, the length of the connecting member can be made shorter, so that the smooth inflation of the curtain member can be obtained without any interference with the connecting member, and the tension can be generated easily by the connecting member.

According to another embodiment of the present invention, the specified portion of the curtain member is configured to be located substantially at the same height as the specified lower-side position of the vehicle-body pillar to be connected by the connecting member when the curtain member inflates. Thereby, the connecting member can generate the tension in a state in which it extends substantially horizontally. Further, the length of the connecting member can be made shorter. Accordingly, the tension of the tension line of the shorter curtain member having the shorter length can be increased more surely.

According to another embodiment of the present invention, the connecting member is configured to be located on a vehicle-body outward side relative to the curtain member when the curtain member inflates. Thereby, the connecting member may not contact the passenger directly. Further, the bending portion can be prevented from moving toward the vehicle-body outward side. Accordingly, it can be restrained for the passenger to have uncomfortable feelings when the curtain member inflates, and a state of complete inflation of the curtain member in the vehicle compartment can be kept properly.

According to another embodiment of the present invention, the bending portion bends toward an opposite side to the vehicle-body pillar or toward the vehicle compartment, and the connecting member connects a first specified portion which is positioned at the bending portion of the curtain member to a second specified portion of the curtain member which is positioned at another portion than the bending portion. Thereby, the inflation move of a non-bending portion (another portion than the bending portion) of the curtain member can be transmitted to the bending portion via the connecting member. Accordingly, the bending portion of the curtain member can be made inflate promptly at the vehicle-body opening by the connecting member in accordance with the inflation move of the non-inflatable portion.

According to another embodiment of the present invention, the first specified portion is set near a free end of the bending portion of the curtain member in the stored state. Thereby, the inflation force can be applied to the tip of the bending portion when the curtain member inflates. Accordingly, the bending portion can be pulled out toward the vehicle compartment quickly so as to inflate promptly.

According to another embodiment of the present invention, the second specified portion is set at a portion of the curtain member in the stored state which moves away from the vehicle-body pillar when the curtain member inflates. Thereby, the move of the portion of the curtain member which quickly inflates (i.e., which moves away from the vehicle-body pillar) can be transmitted to the bending portion. Accordingly, the inflation force can be applied to the bending portion more quickly so that the bending portion can inflate more promptly.

According to another embodiment of the present invention, the second specified portion is set so as to be positioned below a middle portion of the inflating curtain member in the vertical direction. Thereby, the move of the portion of the curtain member which quickly inflates (i.e., which is positioned below the middle portion of the inflating curtain member in the vertical direction) can be transmitted to the bending portion. Accordingly, the inflation force can be applied to the bending portion more quickly so that the bending portion can inflate more promptly.

According to another embodiment of the present invention, the curtain member has an inflation-restraint portion near the vehicle-body pillar, the second specified portion is set at a portion of the inflating curtain member which is closer to a gas supply port than the inflation-restraint portion of the inflating curtain member is, and the first specified portion is set at a portion of the inflating curtain member which is downstream of the inflation-restraint portion of the inflating curtain member. Thereby, the curtain member can be made inflate by utilizing the difference in inflation timing between the upstream and the downstream of the inflation-restraint portion. That is, the portion downstream of the inflation-restraint portion can be pulled out into the vehicle compartment by the portion upstream of the inflation-restraint portion which inflates early. Accordingly, the bending portion can be smoothly pulled out of the roof trim into the vehicle compartment at an early stage of the inflation, so that the bending portion can be made inflate completely at a late stage of the inflation.

According to another embodiment of the present invention, at least part of area of the curtain member which is from an upper-edge end of the curtain member to the specified portion of the curtain member which is connected by the connecting member is folded in a bellows shape. Thereby, even if one end of the connecting member is connected to the specified portion of the curtain member, the other end of the connecting member can be pulled out outward directly without going by way of the tip portion of the bending portion. Accordingly, the length of the connecting member can be made properly short.

According to another embodiment of the present invention, at least part of area of the curtain member which is from an upper-edge end of the curtain member to a portion which includes the first and second specified portions of the curtain member which are connected by the connecting member is folded in a bellows shape. Thereby, even if one end of the connecting member is connected to the specified portion of the curtain member, the other end of the connecting member can be pulled outward directly without going by way of the tip portion of the bending portion. Accordingly, the length of the connecting member can be made properly short.

According to another embodiment of the present invention, an area of the curtain member which is from the part of area of the curtain member which is from the upper edge end to the specified portion to a lower-edge end of the curtain member is substantially folded in a roll shape. Thereby, the portion folded in the roll shape can be made inflate stably between the passenger and the vehicle-body opening. In particular, as the bending portion inflates toward the vehicle-body pillar, the portion folded in the roll shape inflates downward at the late stage of the inflation. Accordingly, the stability of the inflation direction can be increased. Further, the roll-shaped folding can facilitate an attachment of the curtain member.

According to another embodiment of the present invention, the pillar trim is a pillar trim to cover a pair of rear vehicle-body pillars which are provided at a vehicle rear portion, the vehicle-body opening is a rear opening which is provided between the pair of rear vehicle-body pillars, and the bending portion is provided at the rear vehicle-body pillars. Thereby, the tension line can be properly formed at the curtain member which covers the rear opening of the vehicle.

According to another embodiment of the present invention, there is provided a deformation-restraint means to restrain an amount of deformation of the pillar trim which is caused by contact with the connecting member or curtain member when the curtain member inflates at an upper end portion or an inward end portion of the pillar trim. Thereby, even if the connecting member or the curtain member contact the pillar trim, the stress which may generate at the pillar trim can be reduced. Accordingly, the proper inflation of the curtain member can be ensured.

According to another embodiment of the present invention, part of the curtain member in the stored state is positioned between an upper-side rear end portion of the pillar trim and the vehicle body. Thereby, the upper-side rear end of the pillar trim can be deformed so as to move away from the vehicle body by the inflation force of the curtain member when the curtain member inflates. Accordingly, a gap between the pillar trim and the vehicle body generates, so that the connecting member covered with the pillar trim can be easily made get out into the vehicle compartment through this gap. Thus, the inflation of the connecting member can be improved.

According to another embodiment of the present invention, a connecting position of the connecting member to the curtain member is set at the part of the curtain member which is located between the upper-side rear end portion of the pillar trim and the vehicle body. Thereby, the connecting member can be made short and also the connection position of the connecting member to the rear vehicle-body pillar can be set at a relatively low level. Accordingly, the connection position of the connecting member to the vehicle body, which becomes a basic point of the tension line, is set at the relatively low portion of the rear vehicle-body pillar, and also the tension line can be formed at the curtain member surely.

According to another embodiment of the present invention, there is provided a back door to open and close the rear opening, and a vertical wall portion which has a substantially L-shaped cross section is provided at a rear end of the pillar trim so as to face to a front end of the back door in a plan view. Thereby, even if interference of a baggage with the pillar trim occurs at baggage loading, it can be prevented that the pillar trim is deformed easily. Accordingly, the proper inflation of the curtain member can be ensured and also the proper rigidity of the pillar trim as a wall face of the baggage competent can be provided.

According to another embodiment of the present invention, the bending portion of the curtain member is provided near an upper end portion of the rear vehicle-body pillar so as to be directed forward. Thereby, there is no need to make a disposition space for the bending portion at the upper edge of the rear opening. Further, the bending portion inflates so as to cover the rear vehicle-body pillar when the curtain member inflates, not only the rear opening but a larger area of the vehicle rear portion. Thus, storing the curtain member can be easily achieved without providing any large storage space at a rear header of the vehicle at the upper edge of the rear opening or the like.

According to another embodiment of the present invention, a rear seat is provided in front of the rear vehicle-body opening, and the bending portion of the curtain member is provided along the upper edge of the rear opening so as to be directed inward. Thereby, the bending portion does not inflate forward greatly when the curtain member inflates. Thus, a strong interference of the head of the passenger seated in the rear seat with the curtain member can be prevented properly, thereby making the curtain member inflate to cover the rear opening surely. Accordingly, the curtain member can be made inflate to improve the safety against the vehicle collision even in case the passenger is seated in the rear seat close to the vehicle body.

Other features, aspects, and advantages of the present invention will become apparent from the following description which refers to the accompanying drawings.

BRIEF DESCRIPTION OF THE DRAWINGS

Hereinafter, preferred embodiments of the present invention will be described referring to the accompanying drawings.

Embodiment 1

Figure 1:
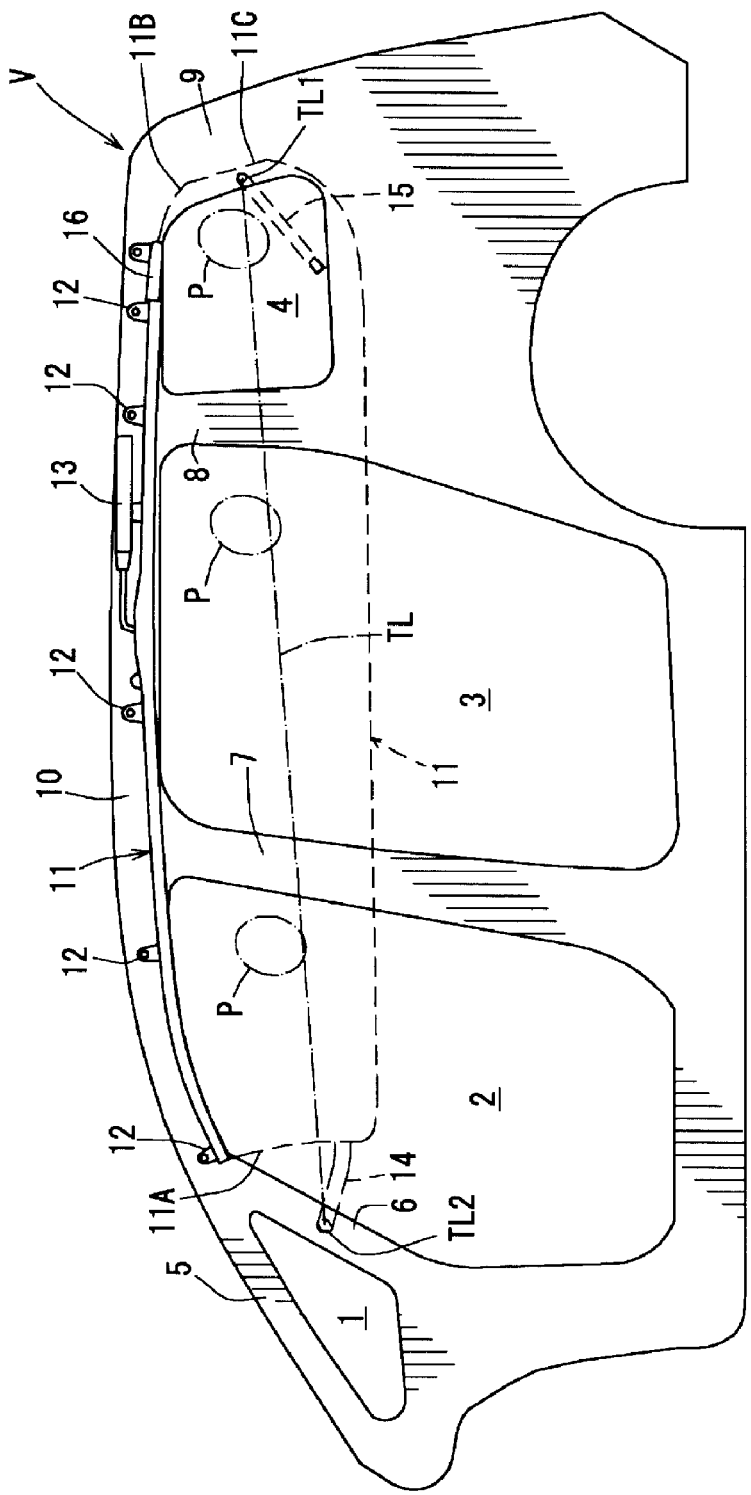
FIG. 1 is a schematic side view of an interior structure according to a first embodiment of the present invention.
Figure 2:
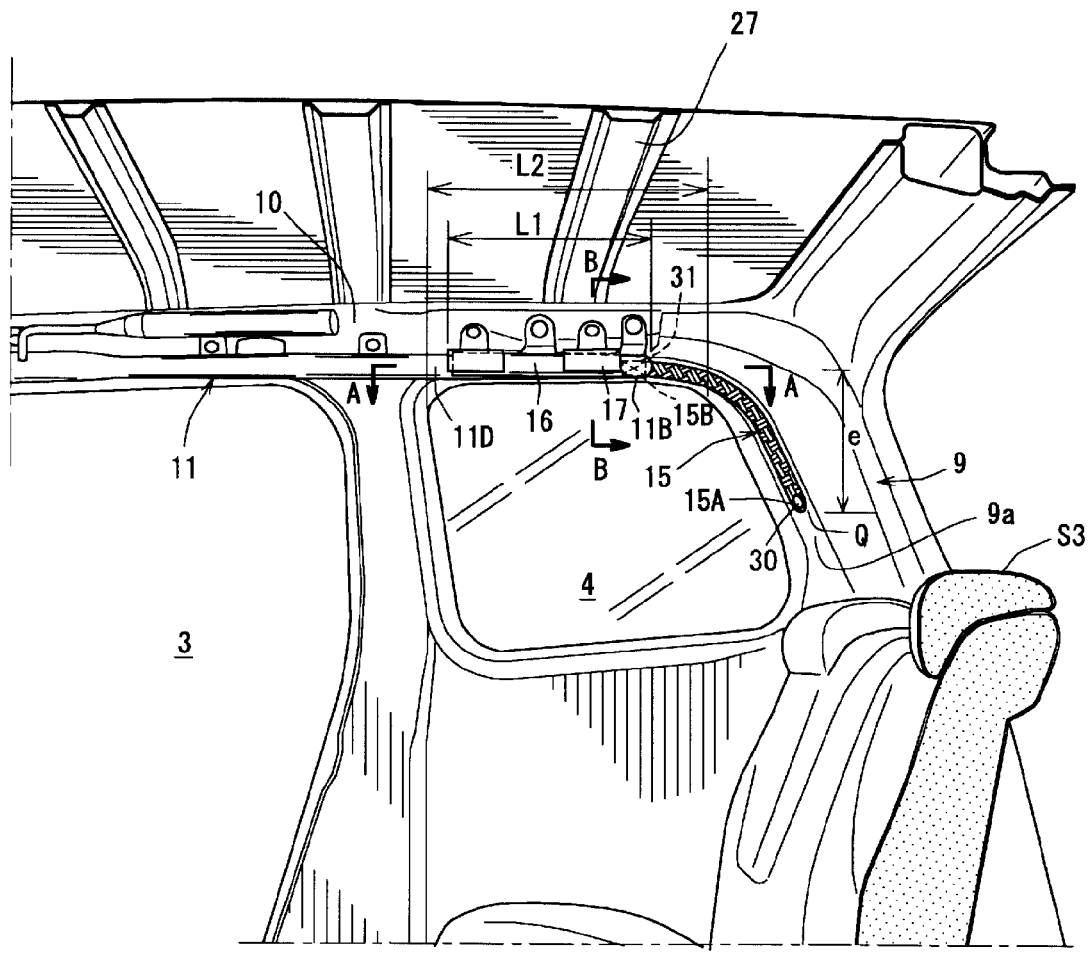
FIG. 2 is a side view of an inside of a vehicle compartment, in which a trim and the like beside a third-row seat are removed.
Figure 3:
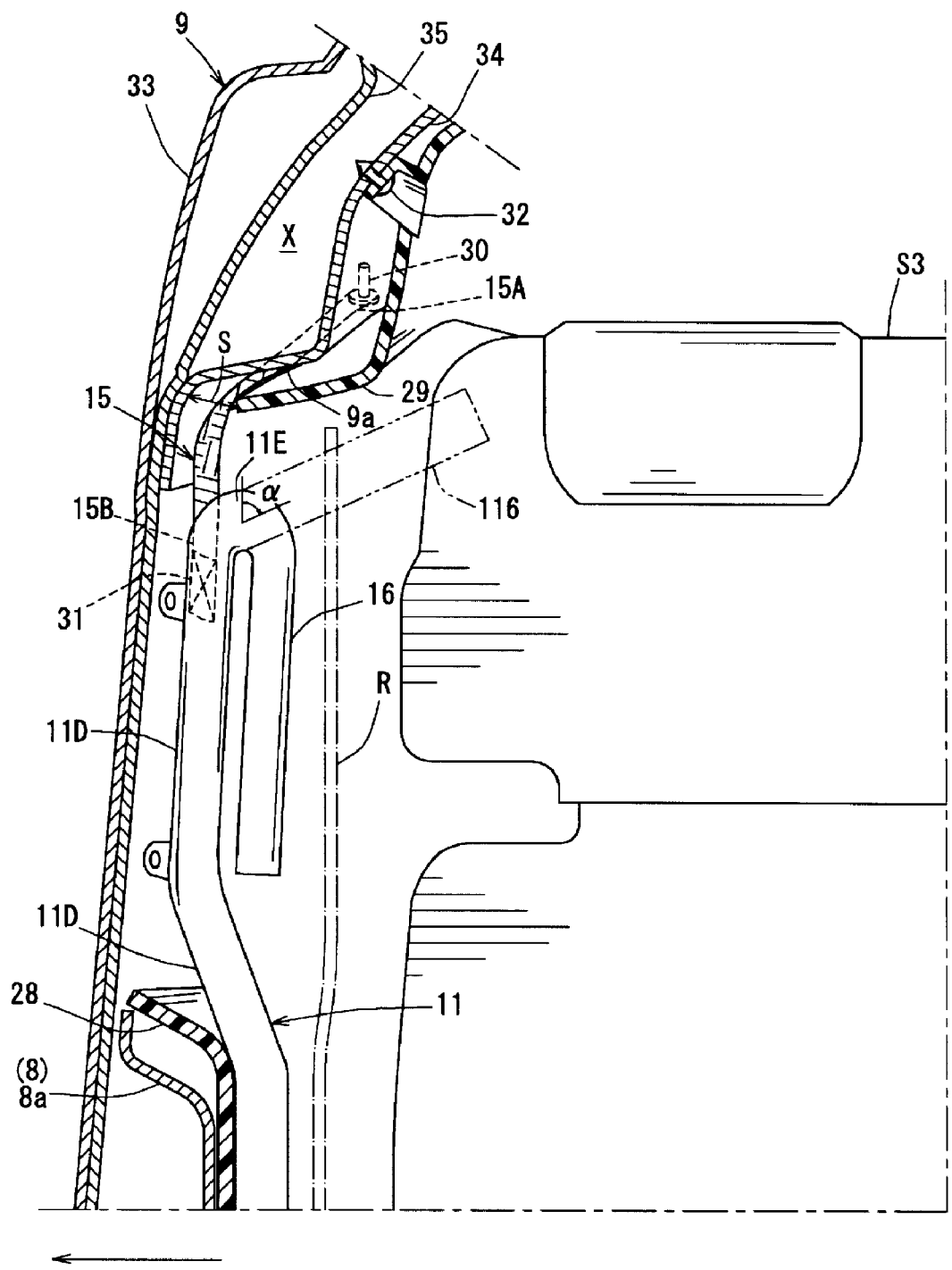
FIG. 3 is a sectional view taken along line A-A of FIG. 2.
Figure 4:
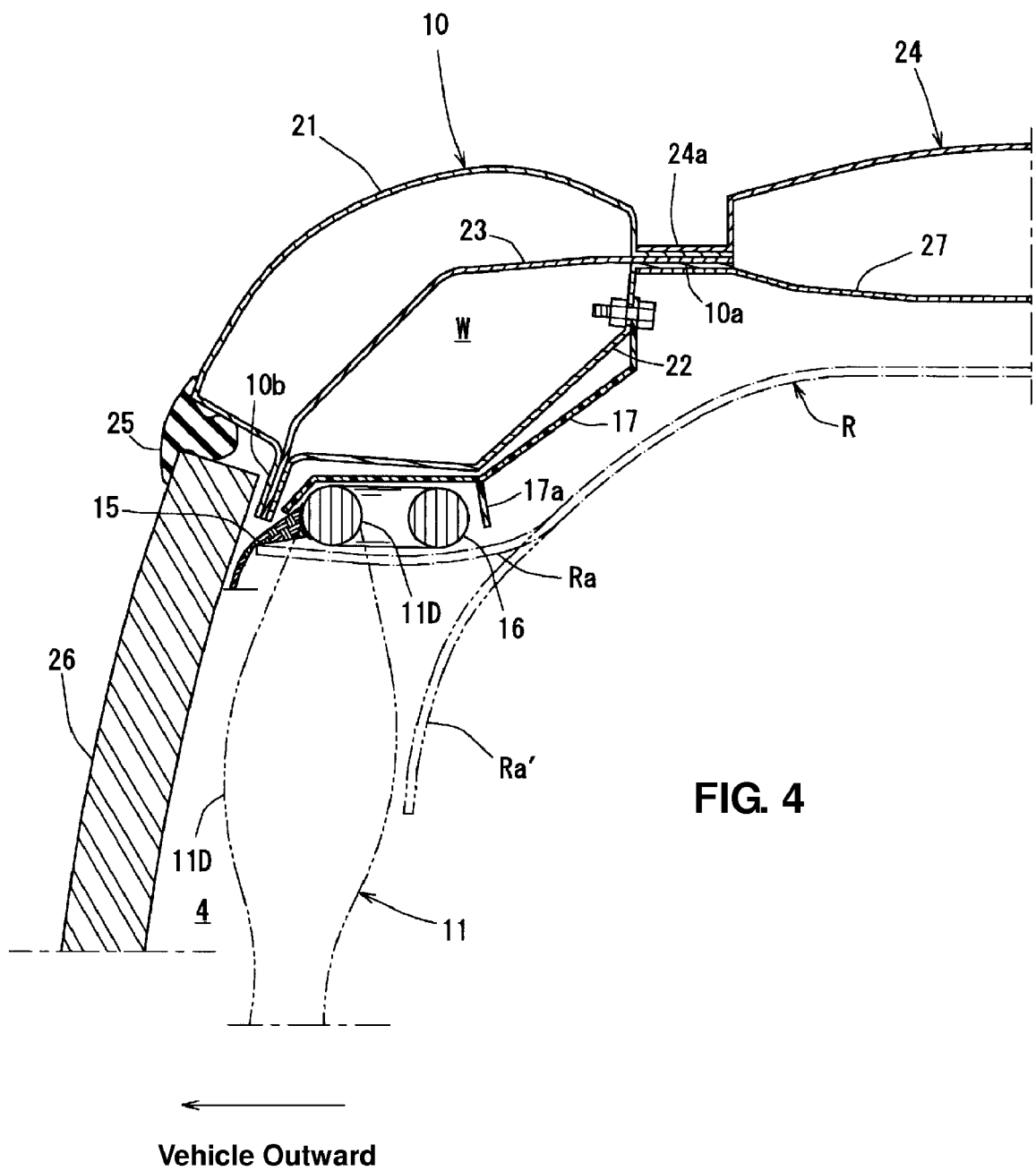
FIG. 4 is a sectional view taken along line B-B of FIG. 2.

FIG. 1 is a schematic side view of an interior structure according to a first embodiment of the present invention. FIG. 2 is a side view of an inside of a vehicle compartment, in which a trim and the like beside a third-row seat are removed. FIG. 3 is a sectional view taken along line A-A of FIG. 2. FIG. 4 is a sectional view taken along line B-B of FIG. 2. As shown in FIG. 1, a vehicle V to which a first embodiment is applied is a wagon type of vehicle which is equipped with three rows of seats (not illustrated) so that three persons P (only heads are illustrated by one-dotted broken lines) can be seated in a vehicle compartment in a vehicle longitudinal direction. At a side wall of a vehicle body of the vehicle V are provided a triangular-window opening 1, a front-door opening 2, a rear-door opening 3, and a quarter-window opening 4 in order from the vehicle front.

Further, a first pillar 5 which extends obliquely rearward and upward is provided in front of the triangular-window opening 1, and a second pillar 6 which extends likewise is provided in back of the triangular-window opening 1. A third pillar 7 which extends vertically is provided in back of the front-door opening 2. A fourth pillar 8 which extends vertically is provided in back of the rear-door opening 3. A fifth pillar 9 which extends vertically is provided in back of the quarter-window opening 4.

A roof side rail portion 10 which extends in the vehicle longitudinal direction is provided above the front-door opening 2, rear-door opening 3 and quarter-window opening 4. A curtain member 11 in a stored state is disposed longitudinally at the roof side rail portion 10 along upper-edge portions of the respective openings 2, 3, 4. The curtain member 11 is fixed to the roof side rail portion 10, as a vehicle-body member, via plural attaching flanges 12 . . . 12, so that the curtain member 11 is fixed firmly to the vehicle body. The curtain member 11, which is formed in an airbag shape and made of cloth as known well, comprises an inflatable portion and a non-inflatable portion. Herein, the curtain member 11 inflates in the vehicle compartment in a curtain shape when gas is supplied into its inflatable portion (its inflating state is illustrated by a broken line in FIG. 1).

The curtain member 11 inflates, as shown in FIG. 1, so as to cover an upper portion of the front-door opening 2, an upper portion of the rear-door opening 3, and the quarter-window opening 4, thereby reducing an impact load which may act on the head P or any other part of the passenger at a vehicle side collision or the like. Herein, while the curtain member 11 is folded in a specified manner in the stored state, folding in a manner of bellows shape may be preferable when considering operation of the curtain member 11 which will be described later. Of course, folding in a manner of roll shape may be applied instead as long as the operation described later can be achieved. An inflator 13 which produces and supplies the gas into the inflatable portion of the curtain member 11 at the vehicle side collision and the like is provided at a position above the center of the curtain member 11. The inflator 13, which is made of a long cylindrical member, extends in the vehicle longitudinal direction like the curtain member 11, and operates to generate the gas when receiving an operational signal at the vehicle side collision and the like.

At a second-pillar side 11A (a front-side end portion) of the curtain member 11 is provided a first tether member 14 which is of a band shape. The first tether member 14 connects the side end portion (11A) of the curtain member 11 to a middle portion of the second pillar 6. The first tether member 14 can generate a tension at the second-pillar side 11A of the curtain member 11 when the curtain member 11 inflates. Meanwhile, at a fifth-pillar side 11B (a rear-side end portion) of the curtain member 11 is provided a second tether member 15 which is of a band shape as well. The second tether member 15 connects the curtain member 11 to the fifth pillar 9. The second tether member 15 can generate a tension at the fifth-pillar side 11B of the curtain member 11 when the curtain member 11 inflates as well. Herein, the second tether member 15 is not fixed to an outside end portion 11C of the curtain member 11, but fixed to a central side. This is because the curtain member 11 in its stored state has a bending portion 16 at its side of the fifth-pillar side 11B.

Hereinafter, a specific structure of the bending portion and the second tether member will be described referring to FIGS. 2, 3 and 4. As shown in FIG. 2, the bending portion 16 is formed at the fifth-pillar side 11B of the curtain member 11 in the stored state. Herein, the bending portion 16 is formed so as to bend forward (toward an opposite side to the fifth pillar) on the inside of a body portion 11D of the curtain member 11. Specifically, the bending portion 16 is configured to be turned back (bent) along the upper edge of the quarter-window opening 4, and such that its longitudinal length L1 is shorter than a longitudinal length L2 of the quarter-window opening 4.

Further, the bending portion 16 is held at a holding bracket 17 which is fixed to the roof side rail portion 10. Specifically, as shown in FIG. 4, the bending portion 16 is held at the holding bracket 17, which has a cross section having a receiving portion 17a with a downward opening, so as to be located beside the body portion 11D. The roof side rail portion 10, at which the bending portion 16 is held, comprises an outer panel 21 and an inner panel 22 which forms a closed cross section W. A reinforcement member 23 is provided in the closed cross section to increase rigidity. To an inner-end flange 10a of the roof side rail member 10 is connected an outer-end flange 24a of the roof panel 24, and at an outer-end flange 10b of the roof side rail member 10 is supported a quarter-window glass 26 via a seal member 25. Herein, a roof cross reinforcement 27 which extends in a vehicle width direction is provided below the roof panel 24.

The curtain member 11 and the holding bracket 17 are covered with a roof trim R which forms a ceiling of the vehicle compartment at a position below the roof side rail portion 10. This roof trim R is made from soft urethane foam or resin, so that it can be easily deformed when receiving an external load. Thus, when the curtain member 11 inflates, a side portion Ra of the roof trim R is deformed downward as illustrated (Ra') so as to open downward. Accordingly, the inflation of the curtain member 11 may not be prevented, thereby improving the safety function of the curtain airbag device.

Further, when the curtain member 11 inflates, since a seam line portion 40 (as an inflation-restraint portion; see FIG. 6) is provided as described later, only the body portion 11D moves downward (toward the quarter-window opening 4) first as shown by a two-dotted broken line, and then the bending portion 16 inflates subsequently. Accordingly, the curtain member 11 can be made inflate into the vehicle compartment surely even if the amount of deformation (opening) of the roof trim R is small. The curtain member 11 is provided in such a manner that part of the body portion 11D of the curtain member 11 bends slightly outward in the plan view as shown in FIG. 3. Thereby, the amount of projection of the curtain member 11 toward the vehicle compartment can be made as little as possible despite the bending portion 16 being disposed beside the body portion 11D in the plan view. Accordingly, the passenger seated in the third-row seat S3 may not have an improper sense of pressure from the provision of the curtain member 11. Moreover, the body portion 11D is located close to the vehicle compartment in an area without the bending portion 16, so an inner panel 8a of the fourth pillar 8 can be disposed on the outside of the body portion 11D. Herein, a reference numeral 28 denotes a C pillar trim covering the inside of the inside of the fourth pillar 8.

Meanwhile, the second tether member 15 is made of a long cloth member as shown in FIG. 2. Its rear end 15A is fixed to a specified lower-side position Q of the fifth pillar 9 which is located below the middle portion of this pillar 9 in the vertical direction (i.e., at the position which is away from the top end of the fifth pillar 9 by a distance e of about 100 mm or greater) via a fixing pin 30. Its front end 15B is fixed to the body portion 11D of the curtain member 11 via a seam portion 31. Specifically, as shown in FIG. 3, the front end 15B is firmly seamed to a specified portion of the body portion 11D near a bend position 11E via the seam portion 31. Meanwhile, the rear end 15A is firmly fixed to a front side wall 9a of the fifth pillar 9 via the fixing pin 30.

Further, the second tether member 15 extends trough a gap S (about 1 through 3 mm) between the fifth pillar 9 and a D pillar trim 29 which covers the fifth pillar to connect the curtain member 11 to the fifth pillar 9. The D pillar trim 29 is made from hard synthetic resin, so that easy deformation of the D pillar trim 29 may be restrained properly. Herein, the D pillar trim 29 is attached to the fifth pillar 9 via a clip member 32 which is detachable so that the second tether member 15 can move freely despite the D pillar trim 29 being not deformed when the curtain member 11 inflates.

The fifth pillar 9 forms a closed cross section X which extends vertically with its outer panel 33 and inner panel 34. A reinforcement member 35 is provided in the closed cross section X to increase its rigidity. To the inner panel 34 are attached the second tether 15 and the D pillar trim 29. A member R shown by a one-dotted broken line denotes a roof trim, which covers the curtain member 11 in the stored state. Herein, instead of the above-described bending portion 16 which is formed to be turned back forward completely, another type of bending portion 116, which is shown by a two-dotted broken line, may be applied. In this case, the bending portion 116 bends toward the vehicle compartment and its bending angle α may be preferably set at 50 through 180 degrees.

Figure 5:
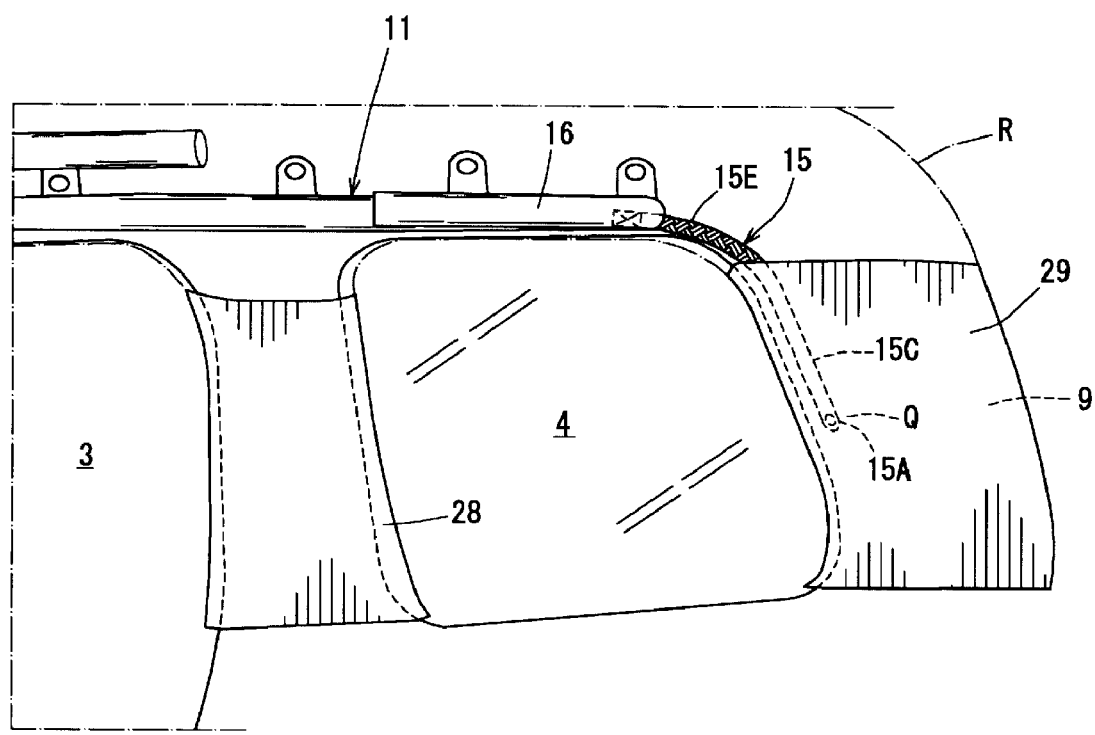
FIG. 5 is a side view which shows a stored state of a curtain member.
Figure 6:
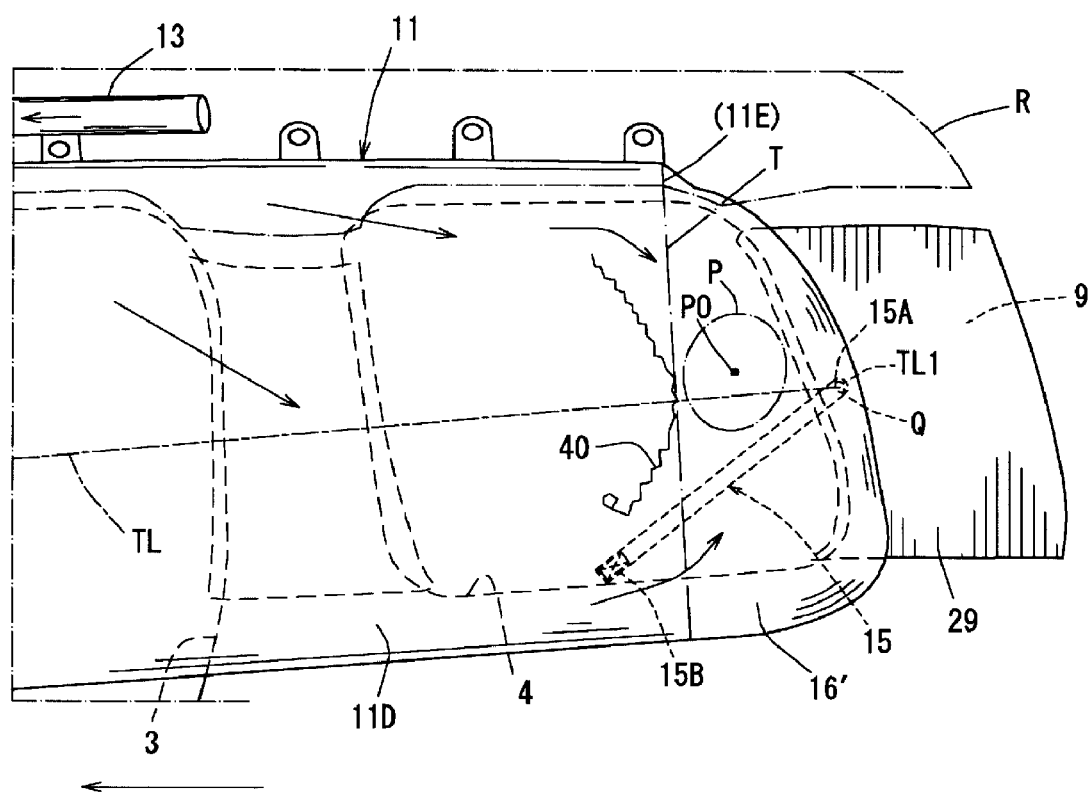
FIG. 6 is a side view which shows an inflating state of the curtain member.

Hereinafter, the operation of the curtain airbag device according to the present embodiment will be described referring to FIGS. 5 and 6. FIG. 5 is a side view which shows the stored state of the curtain member. FIG. 6 is a side view which shows the inflating state of the curtain member. Herein, the roof trim R is illustrated by the one-dotted broken line to show the state of the curtain member 11 apparently.

As shown in FIG. 5, the curtain member 11 in the stored state is disposed in the vehicle longitudinal direction along the upper edge portions of the rear-door opening 3 and the quarter-window opening 4. Herein, the curtain member 11 is covered with the roof trim R. The second tether member 15 is fixed to the specified lower-side position Q of the fifth pillar 9 so that its rear half portion 15C is positioned between the fifth pillar 9 and the D pillar trim 29. Further, a front half portion 15E of the second tether member 15 is positioned between the fifth pillar 9 and the roof trim panel R. Thus, the curtain member 11 and the second tether member 15 are usually covered with the roof trim R and the D pillar trim 29 so as not to be exposed to the vehicle compartment.

As shown in FIG. 6, when the vehicle side collision or the like occur and thereby the side-collision load acts on the vehicle, the operation signal is supplied to the inflator 13 by an impact sensor and a control unit, not illustrated, so that the inflator 13 produces the gas, which makes the curtain member 11 inflate. In this case, the gas flows rearward as shown by arrows. Accordingly, the curtain member 11 inflates rearward from near the inflator 13 and downward so as to cover the rear-door opening 3 and the quarter-window opening 4. Herein, the curtain member 11 has the seam line portion 40, which has a shape shown in this figure, at its central portion. Accordingly, the whole part of the gas may not flow at once into a portion 16' (a portion located behind a two-dotted line T) of the curtain member 11 which corresponds to the bending portion, but the flowing of gas may be divided into an upper part and a lower part of the seam line portion 40. Thus, the portion 16' which corresponds to the bending portion comes to inflate shortly after the body portion 11D does. Accordingly, as described above, the curtain member 11 can be made inflate into the vehicle compartment surely even if the amount of deformation of the roof trim R is small. Herein, the seam line portion 40 is formed on the side of the body portion 11D except the bend position 11E. This is because if the seam line portion 40 is formed at the bend position 11E, the rigidity of the curtain member 11 may increase at the seam line portion 40, so it may become difficult that the curtain member 11 is turned back (bent).

When the curtain member 11 inflates, the second tether member 15 is also pulled by the curtain member 11 so as to be exposed to the vehicle compartment. Herein, since the front end 15B of the second tether member 15 is seamed to the body member 11D of the curtain member 11, the inflation position of the curtain member 11 is restricted, thereby generating the tension. Thus, the tension can be generated between the curtain member 11 and the fifth pillar 9 by the second tether member 15. That is, the tension line TL which extends in the vehicle longitudinal direction can be formed at the curtain member 11. Accordingly, this tension line TL has the rear end TL1 at the fixing position of the second tether member 15 to the fifth pillar 9 and the front end TL2 at the fixing position of the first tether member 14 to the second pillar 6 (see FIG. 1).

Further, the tension line TL is formed at the position below a head gravity center PO of the passenger P seated in the third-row seat. Accordingly, the passenger P can be properly protected at the vehicle rollover. Since the bending portion 16 inflates on the side of the D pillar trim 29, the second tether member 15 which gets out of the D pillar trim 29 can be covered with the portion 16' which corresponds to the bend portion. Thus, the direct contact of the second tether member 15 with the passenger P can be avoided properly. Moreover, since the second tether member 15 is positioned on the outside of the portion 16' which corresponds to the bend portion, the inflation position of the curtain member 11 is so restricted that the curtain member 11 can be prevented from moving outward even if the passenger P contacts the curtain member 11. Thus, the safety of the curtain airbag device can be increased with the second tether member 15 and the bending portion 16.

Hereinafter, the operation and effects of the present embodiment will be described. According to the present embodiment, there is provided the curtain-airbag device including the curtain member 11 which inflates into the vehicle compartment on the inside of the quarter-window opening 4 and the like at the vehicle side collision or the like, the curtain member 11 has its bending portion 16 near the fifth pillar 9 in the stored state, and the second tether member 15 which connects the body portion 11D of the curtain member 11 to the specified lower-side position Q of the fifth pillar 9 is provided. Thereby, the second tether member 15 generates the tension between the body portion 11D of the curtain member 11 and the specified lower-side position Q of the fifth pillar 9 when the curtain member 11 inflates at the vehicle side collision or the like. Thus, the tension line TL which extends in the vehicle longitudinal direction can be formed at the curtain member 11. Accordingly, in the interior structure of a vehicle equipped with a curtain airbag, in which the curtain member 11 is stored inside the roof trim R with the tip portion (16) being turned back (bent), the tension line TL which extends in the vehicle longitudinal direction can be formed at the curtain member 11, so that the quarter-window opening 4 and the like can be kept covered with the curtain member 11.

Further, according to the present embodiment, the portion of the curtain member 11 to be connected by the second tether member 15 is configured to be located on the side of the body portion 11D (the opposite side to the fifth pillar) relative to the bend position 11E of the bending portion 16 of the curtain member 11 when the curtain member 11 inflates. Thereby, the second tether member 15 is connected to the portion of the curtain member 11 which can inflate faster than the bending portion 16. Thus, the second tether member 15 moves promptly, so that the second tether member 15 can generate the tension quickly and surely. Accordingly, the tension producing function of the second tether member 15 can be obtained quickly and surely.

Moreover, according to the present embodiment, the portion of the curtain member 11 which is to be connected by the second tether member 15 is located near the bend position 11E of the body portion 11D. Thereby, the second tether member 15 connects to the portion of the curtain member 11 which is the closest to the fifth pillar 9. Accordingly, the length of the second tether member 15 can be made short, so that the smooth inflation of the curtain member 11 can be obtained without any interference with the second tether member 15, and the tension can be generated easily by the second tether member 15.

Further, according to the present embodiment, the second tether member 15 is configured to be located on the vehicle-body outward side relative to the curtain member 11 when the curtain member 11 inflates. Thereby, the second tether member 15 may not contact the passenger P directly. Further, the bending portion 16 can be prevented from moving toward the vehicle-body outward side by the second tether member 15. Accordingly, it can be restrained for the passenger P to have uncomfortable feelings when the curtain member 11 inflates, and the state of complete inflation of the curtain member 11 in the vehicle compartment can be kept properly.

Embodiment 2

Figure 7:
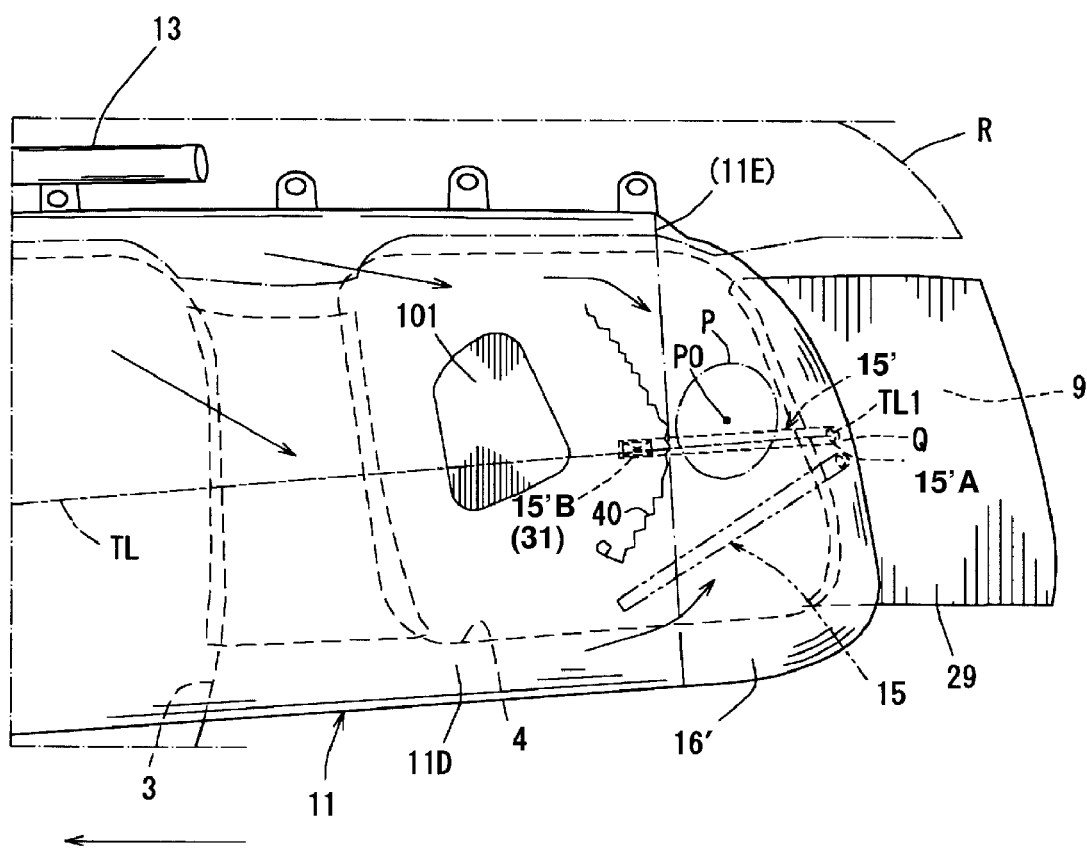
FIG. 7 is a side view which shows the inflating state of the curtain member according to a second embodiment.
Figure 8:
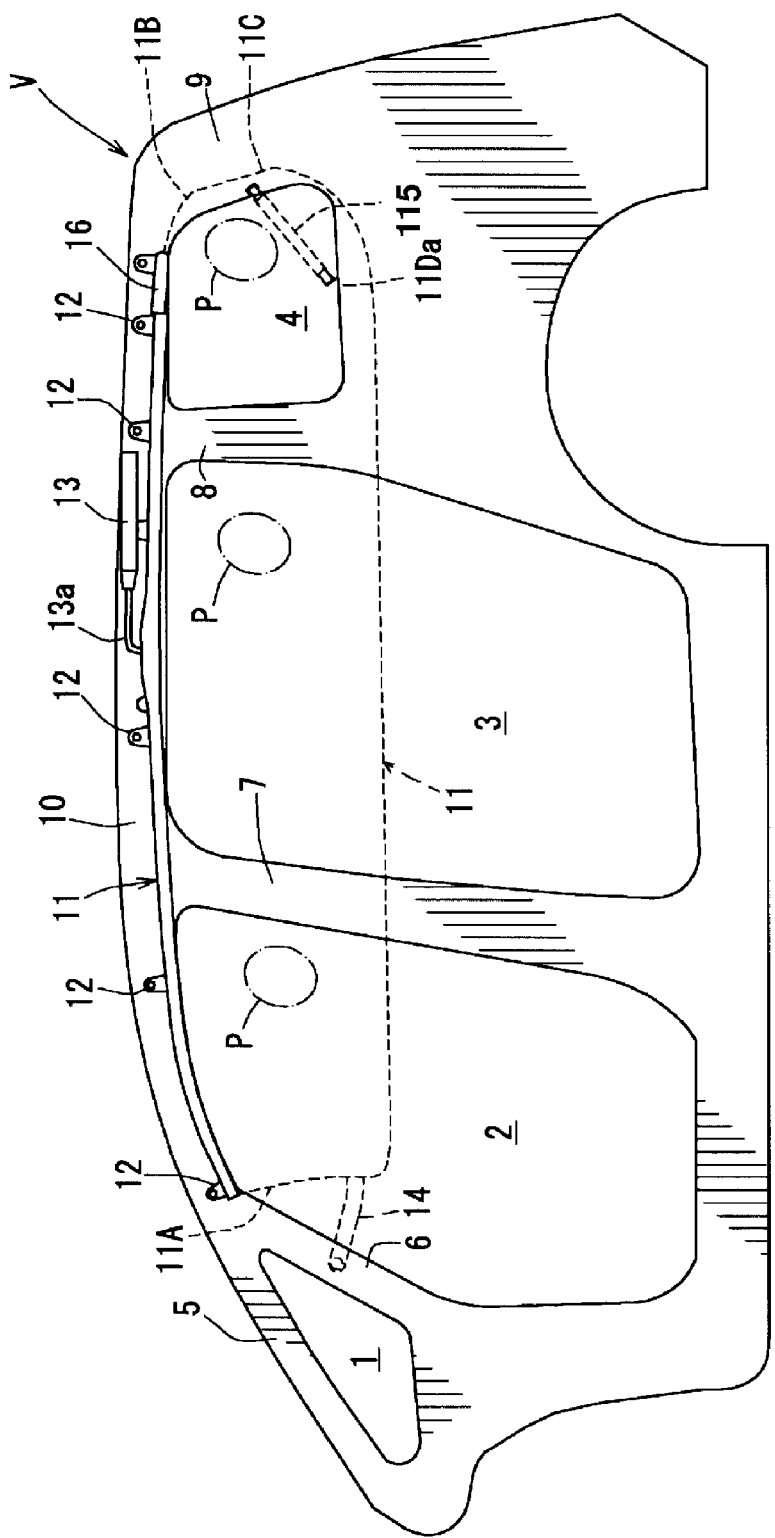
FIG. 8 is a schematic side view of the interior structure according to a third embodiment of the present invention.
Figure 9:
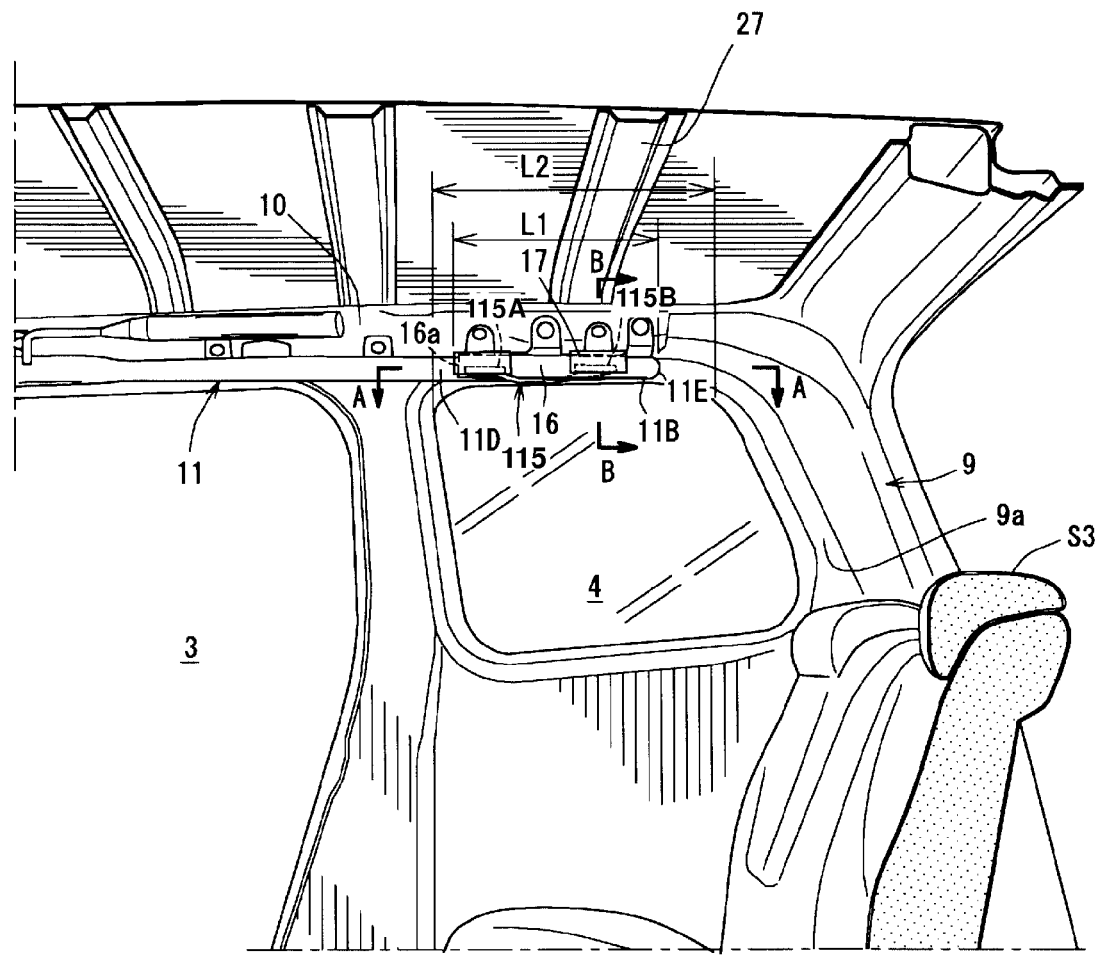
FIG. 9 is a side view of the inside of the vehicle compartment, in which the trim and the like beside the third-row seat are removed according to the third embodiment.

A second embodiment will be described referring to FIG. 7. FIG. 7 is a side view showing the inflation state of the curtain member according to the second embodiment. Herein, the same structure elements as those of the first embodiment are denoted by the same reference characters, and those detailed descriptions will be omitted.

According to the present invention, the fixing position of a second tether member 15' to the fifth pillar 9 and the seam position of the second tether member 15' to the curtain member 11 are positioned slightly above that (15 illustrated by the two-dotted broken line) of the first embodiment. Thereby, the second tether member 15' can extend substantially horizontally when the curtain member 11 inflates. Specifically, a rear end 15'A of the second tether member 15' is fixed to the substantially middle position of the fifth pillar 9 in the vertical direction, and a front end 15'B of the second tether member 15' is seamed to the substantially middle position of the body portion 11D of the curtain member 11 in the vertical direction. That is, the fixing positions of the front end 15'B and the rear end 15'A of the second tether member are positioned substantially at the same level. Accordingly, the second tether member 15' is provided so as to extend substantially horizontally as shown along the tension line TL, so that the support rigidity of the curtain member 11 at the tension line TL can be further increased.

Further, the length of the second tether member 15' can be made shorter than the tether member 15 of the first embodiment. That is, in order that the front end 15'B of the second tether member is positioned at the substantially middle portion of the curtain member 11 in the vertical direction when the curtain member 11 inflates, the length of the second tether member 15' needs to be properly short. Therefore, the second tether member 15' can be necessarily made short. Accordingly, since the second tether member 15' is properly short, the smooth inflation of the curtain member 11 can be obtained without any improper contact with the second tether member 15', thereby ensuring the safe function of the curtain airbag device.

Thus, according to the present embodiment, the connecting portion (15'B) of the second tether member 15' to the curtain member 11 is positioned substantially at the same level as the connecting portion (15'A) of the second tether member 15' to the fifth pillar 9 when the curtain member 11 inflates. Thereby, the second tether member 15' generates the tension in the state in which it extends substantially horizontally when the curtain member 11 inflates. Further, the length of the second tether member 15' can be made shorter. Accordingly, the tension of the tension line TL generated at the curtain member 11 can be increased more surely. Further, the smooth inflation of the curtain member 11 can be obtained without any improper contact with the second tether member 15'.

Moreover, according to the second embodiment, a large-sized non-inflatable portion 101 is provided at the central portion of the curtain member 11 as illustrated. Thereby, the curtain member 11 can be inflated promptly and surely even if the gas volume supplied from the inflator 13 is small. In case this non-inflatable portion 101 is located at a position where the head of the passenger P is not located, the prompt inflation of the curtain member 11 can be obtained, protecting the passenger P properly.

In correspondence of the present invention to the above-described first and second embodiments, the pillar trim corresponds to the D pillar 29, the vehicle-body opening corresponds to the quarter-window opening 4, and the connecting member corresponds to the second tether members 15, 15'.

Embodiment 3

A third embodiment will be described refereeing to FIGS. 8 through 13. According to the present embodiment, there is provided a connecting member which connects two separate specified portions of the curtain member. The same structure elements as those of the above-described first embodiment are denoted by the same reference characters, and those detailed descriptions will be omitted.

Figure 10:
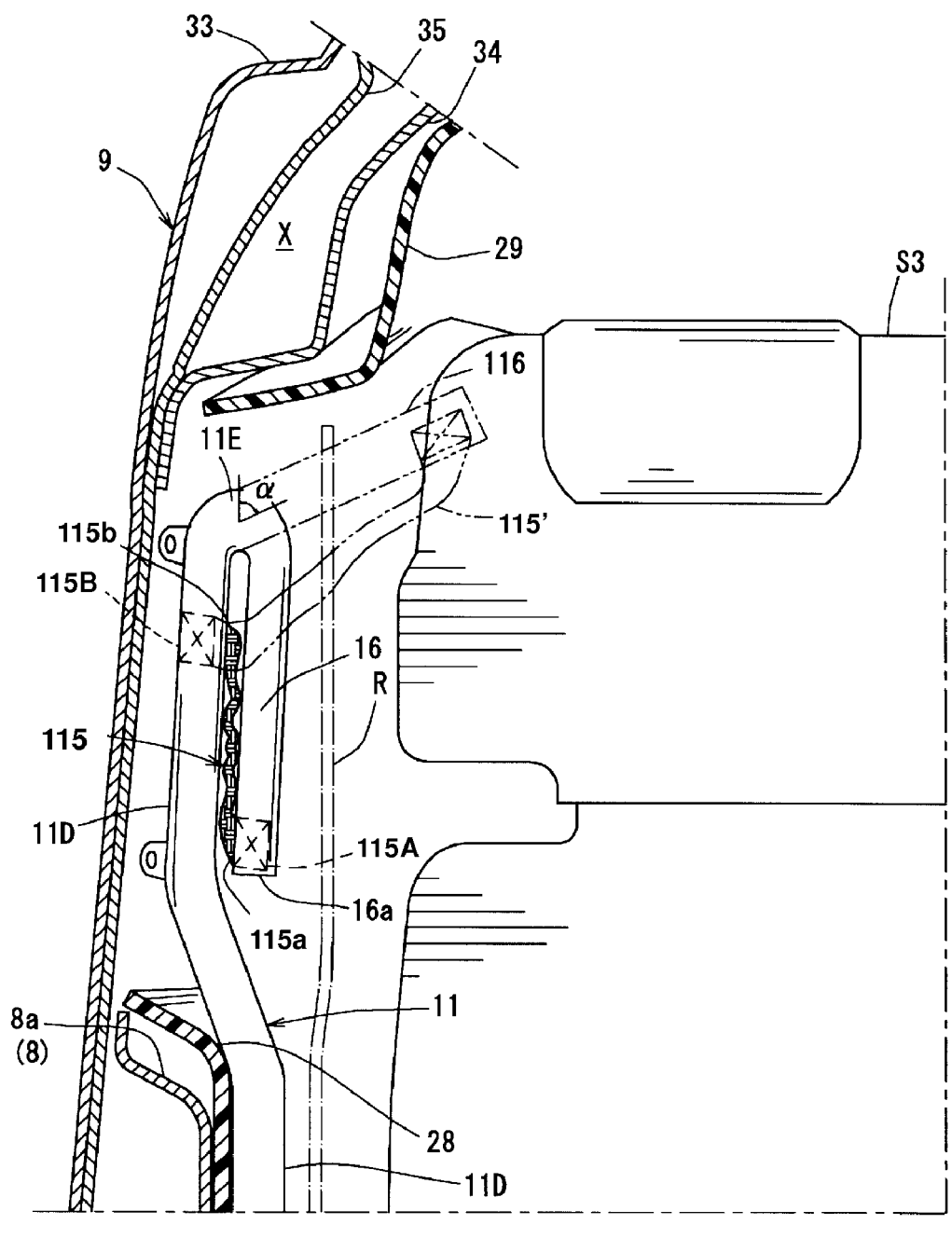
FIG. 10 is a sectional view taken along line A-A of FIG. 9.
Figure 11:
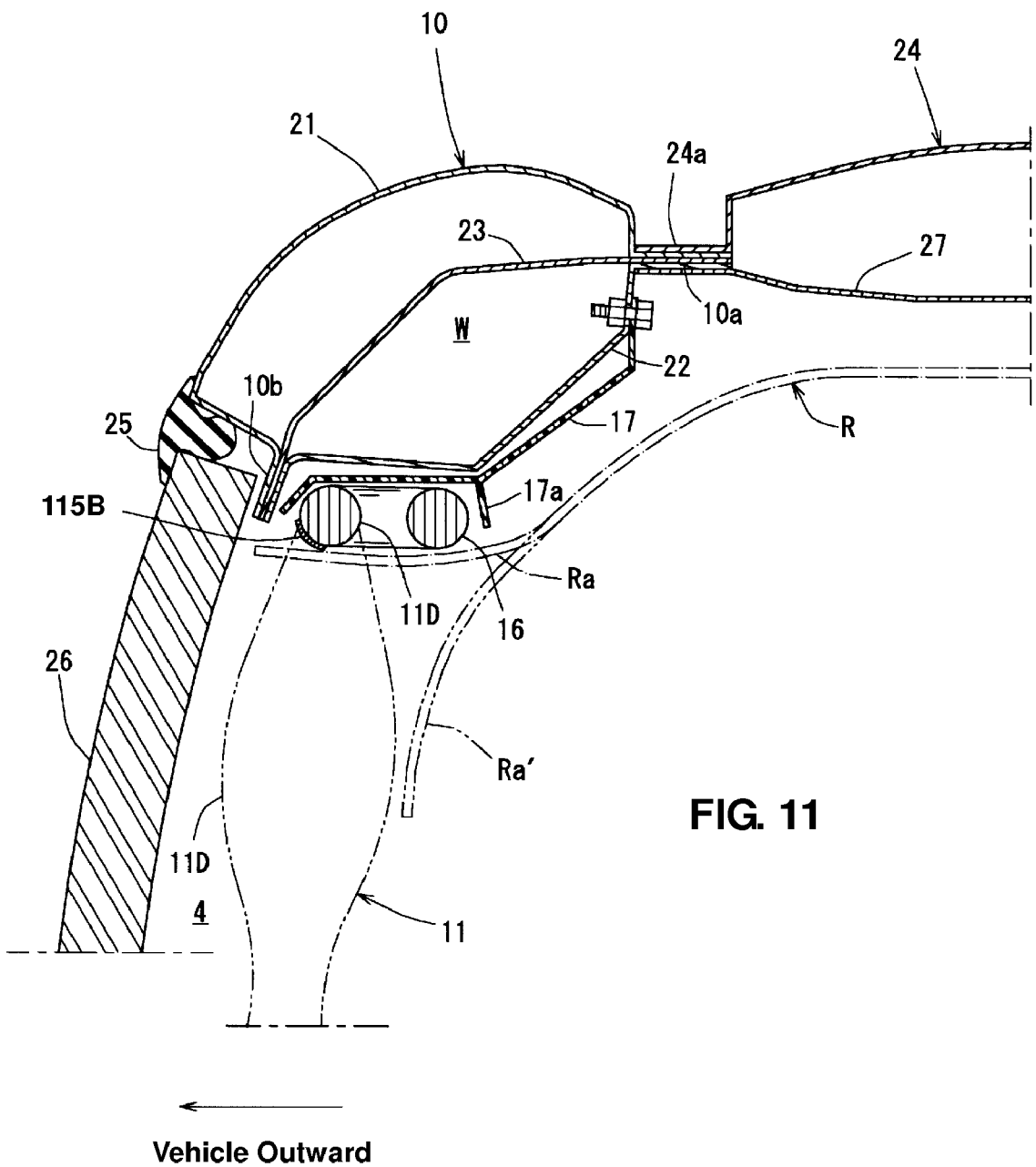
FIG. 11 is a sectional view taken along line B-B of FIG. 9.

As shown in FIG. 10, a second tether member 115 of the third embodiment is configured such that its one end 115a is fixed to a free end 16a of the bending portion 16 via a first seam portion 115A and the other end 115b is fixed to a portion of the body portion 11D near the bend position 11E via a second seam portion 115B. Herein, as described above regarding the first embodiment, instead of the bending portion 16 which is formed to be turned back forward completely, another type of bending portion 116 may be applied in the present embodiment as well. In this case, a second tether member 115' may be disposed so as to expand slightly as shown.

Figure 12:
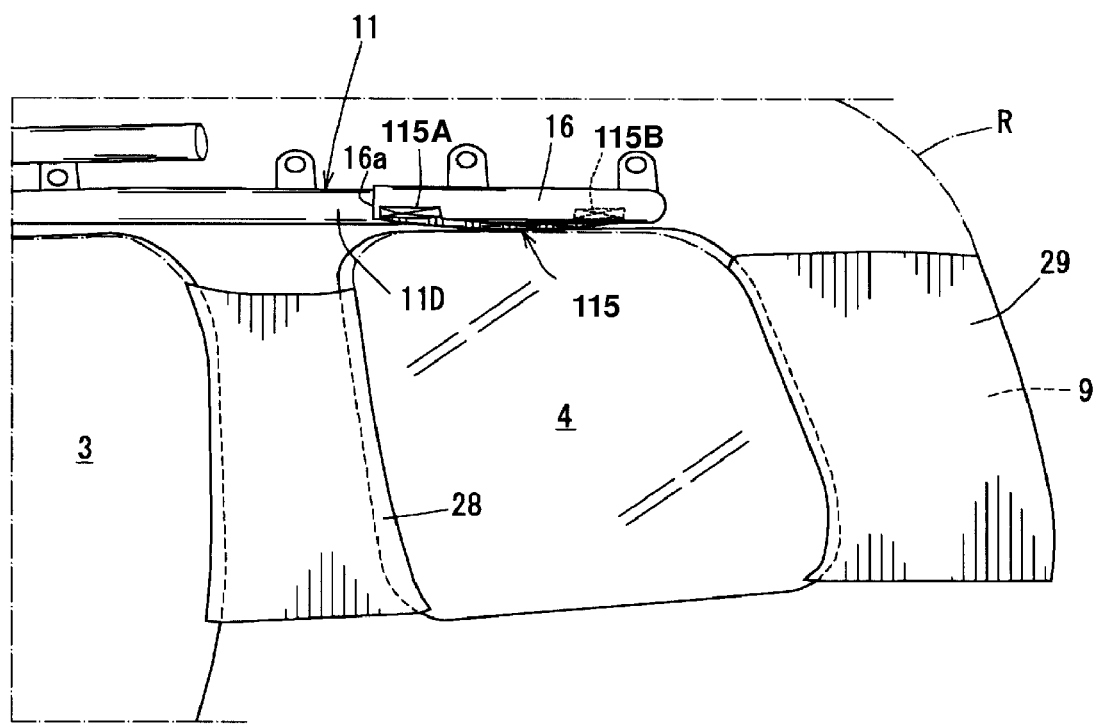
FIG. 12 is a side view which shows the stored state of the curtain member.
Figure 13:
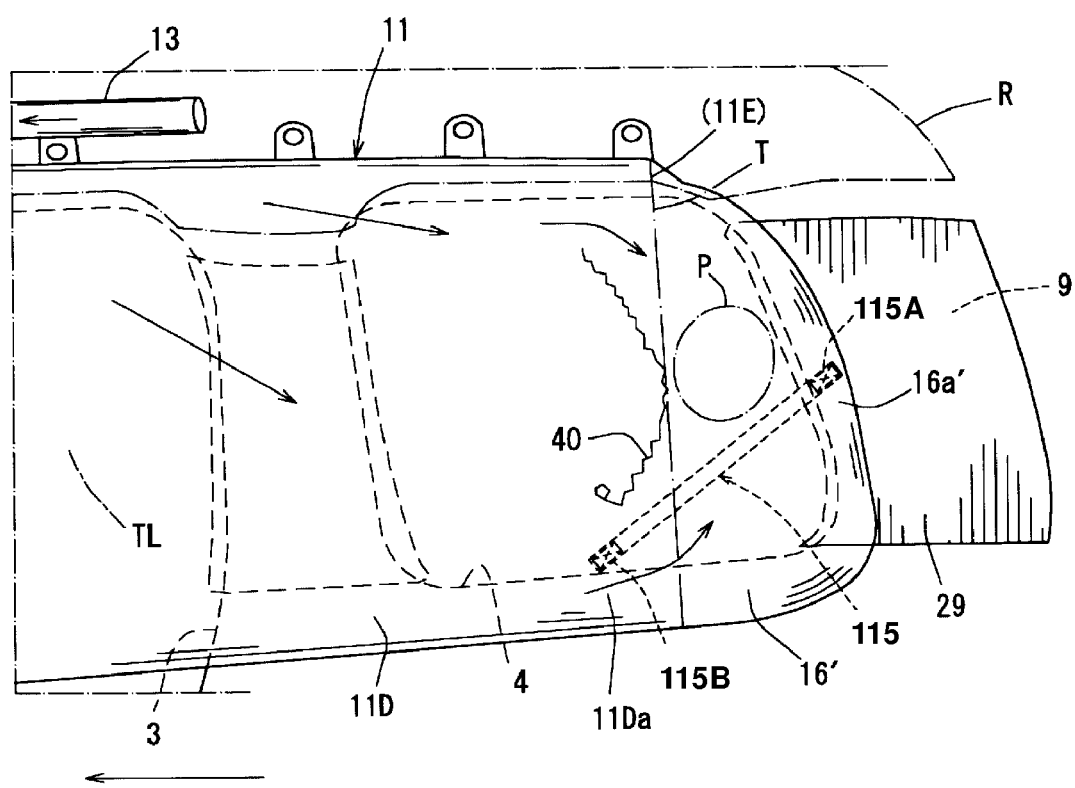
FIG. 13 is a side view which shows the inflating state of the curtain member.

Hereinafter, the operation of the curtain airbag device according to the present embodiment will be described referring to FIGS. 12 and 13. When the gas is supplied by the inflator 13 via a supply port 13a (see FIG. 8), the curtain member 11 inflates downward so as to cover the rear-door opening 3 and the quarter-window opening 4. Herein, the second seam portion 115B of the second tether member 115 is fixed to a lower-side inflatable portion 11Da of the body portion 11D of the curtain member 11. Accordingly, when the gas from the inflator 13 is supplied to the inflatable portion 11Da, the second seam portion 115B inflates downward and moves toward the vehicle compartment first. Herein, since the first seam portion 115A of the tether member 115 is fixed to a portion 16a' which corresponds to the tip (free end) 16a of the bending portion 16, this portion 16a' can be made inflate downward promptly.

That is, the inflation force of the lower-side portion 11Da of the body portion 11D can be transmitted to the tip 16a of the bending portion 16 by using the second tether member 115. Thereby, the bending portion 16 can be pulled out into the vehicle compartment quickly so as to inflate promptly.

Further, the seam line portion 40 which restrains the inflation is provided at the side portion of the curtain member 11 in the present embodiment as well as the first embodiment. Thereby, the curtain member 11 can be made inflate by utilizing the difference in inflation timing between the upstream (vehicle forward) and the downstream (vehicle rearward) of the seam line portion 40 (the inflation-restraint portion). That is, the portion 16a downstream of the seam line portion 40 can be pulled out into the vehicle compartment by the portion 11Da upstream of the seam line portion 40 which inflates early. Accordingly, the curtain member 11 can be smoothly pulled out of the roof trim R into the vehicle compartment at an early stage of the inflation, so that the bending portion 16 can be made inflate completely at the late stage of the inflation. Herein, instead of the seam line portion 40, a large cloth portion which does not inflate at all may be formed at the central portion of the curtain member 11, thereby restraining the flow of the gas from the inflator 13.

In correspondence of the present invention to the above-described third embodiment, the connecting member corresponds to the second tether members 115.

Embodiment 4

A fourth embodiment will be described refereeing to FIGS. 14 through 17. According to the present embodiment, at least part of area of the curtain member which is from an upper-edge end of the curtain member to the specified portion of the curtain member which is connected by the connecting member is folded in a bellows shape. Further, an area of the curtain member which is from the part of area of the curtain member which is from the upper edge end to the specified portion to a lower-edge end of the curtain member is substantially folded in a roll shape. The same structure elements as those of the above-described first embodiment are denoted by the same reference characters, and those detailed descriptions will be omitted.

Figure 14:
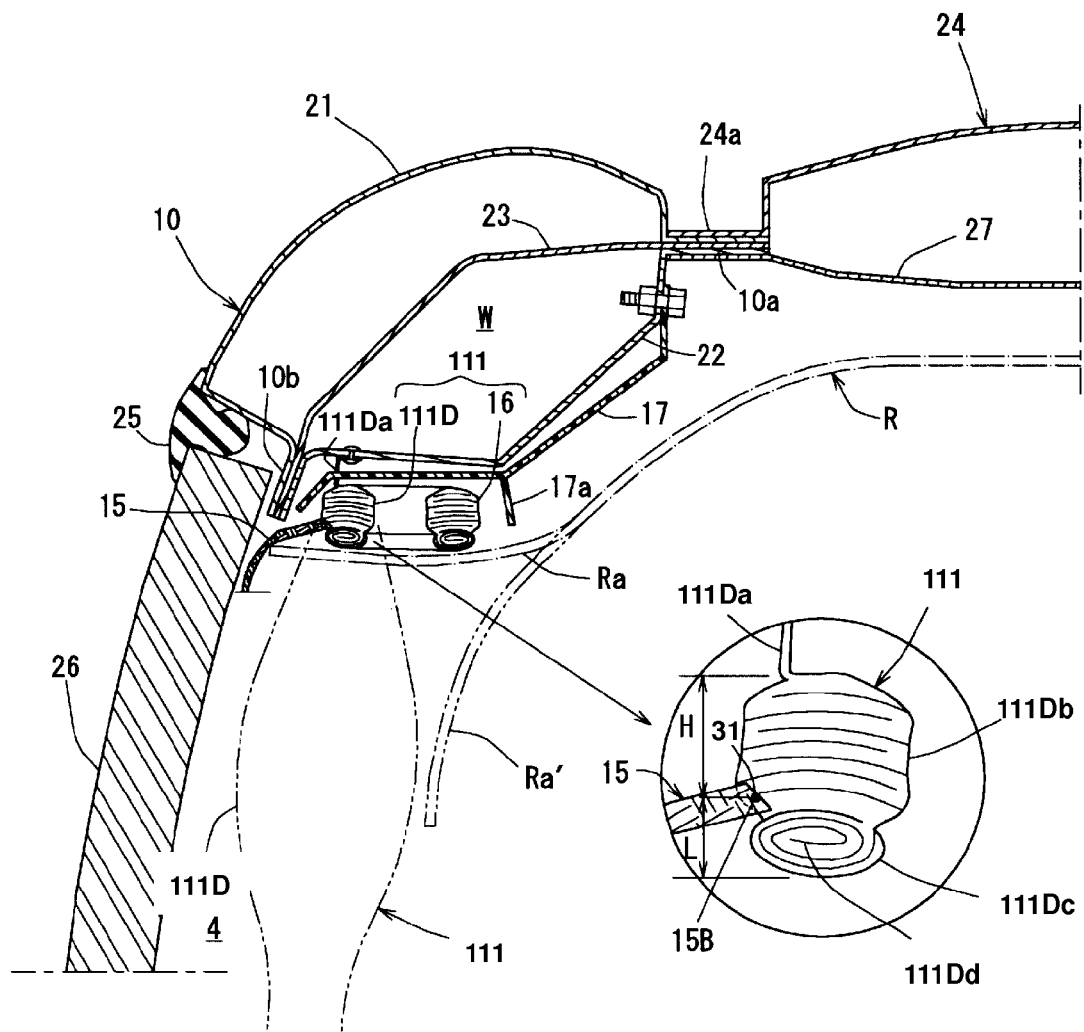
FIG. 14 is a sectional view according to a fourth embodiment, which corresponds to FIG. 4.
Figure 15:
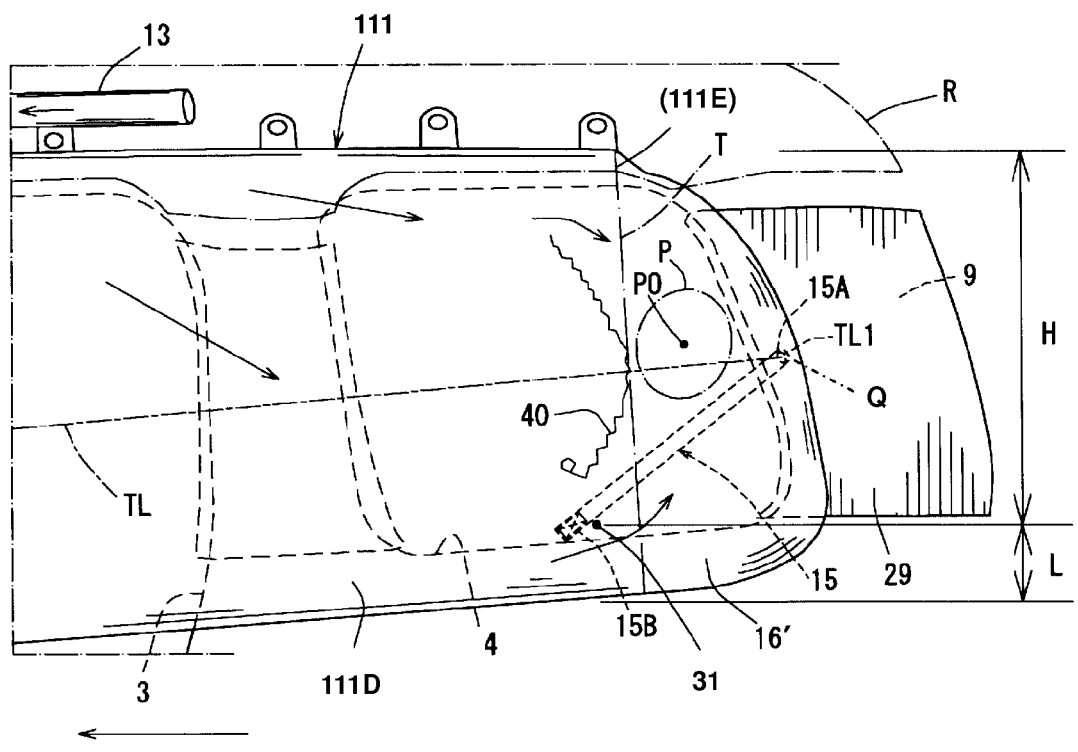
FIG. 15 is a side view which shows an inflating state of a curtain member according to the fourth embodiment.

That is, as shown in detailed view of FIG. 14, a curtain member 111 of the present embodiment is configured such that its upper portion 111Db is folded in a bellows shape and its lower portion 111Dc is folded in a roll shape. Specifically, an area H of the curtain member 111 which is from the upper end portion 111Da to the position 31 where the front end 15B connects is folded in the bellows shape in the vertical direction. Meanwhile, an area L of the curtain member 111 which is from the position 31 to a lower end 111Dd is folded in the roll shape.

Figure 16A:
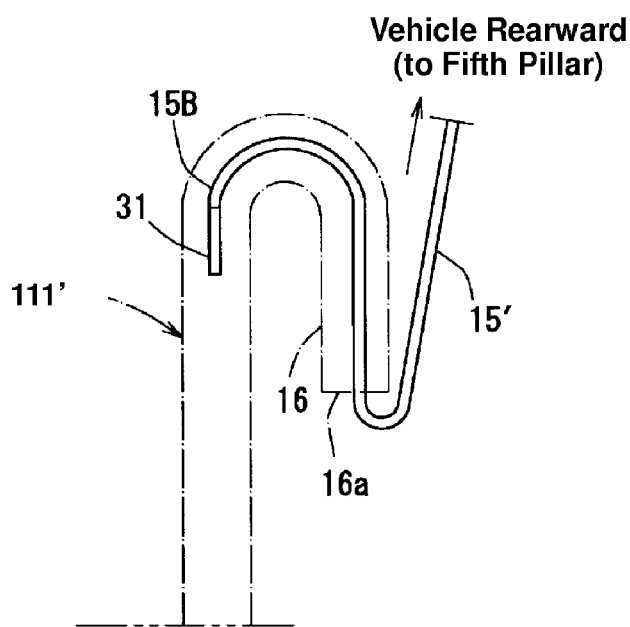
FIG. 16A is a schematic plan view which shows a disposition path of a second tether member in case the curtain is folded in a roll shape.
Figure 16B:
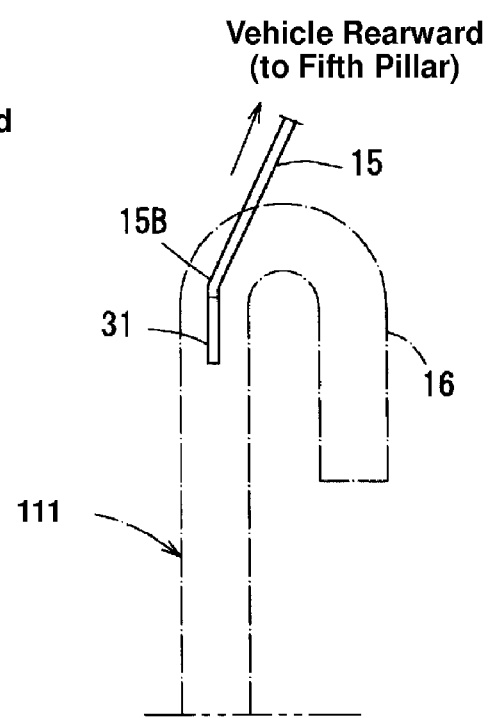
FIG. 16B is a schematic plan view which shows the disposition path of the second tether member in case the curtain is folded in a bellows shape.

The above-described configuration of the curtain member 111 is to make the second tether member 15 as short as possible. The reason for this will be described referring to FIGS. 16A and 16B. FIG. 16A is a schematic plan view which shows a disposition path of the second tether member in case the curtain is folded in the roll shape. FIG. 16B is a schematic plan view which shows the disposition path of the second tether member in case the curtain is folded in the bellows shape. As shown in FIG. 16A, if a curtain member 111' is folded in the roll shape, the seam portion 31 of the front end 15B of a second tether member 15' is withdrawn into the curtain member 111'. Accordingly, in order that the second tether member 15' is exposed to the outside, the second tether member 15' may need to be turned back along the bending portion 16 once so as to be disposed inside the bending portion 16 and then need to be exposed to the outside. Meanwhile, if the curtain member 111 is folded in the bellows shape as shown in FIG. 16B, the seam portion 31 of the front end 15B of the second tether member 15 is always exposed to the outside of the curtain member 111. Accordingly, the second tether member 15 can be made extend straightly rearward of the vehicle.

Thus, the disposition path of the second tether member 15 changes according to the folding configuration of the curtain member 111. Herein, in case of the bellows-shaped folding, there is no need to make the second tether member go by way of the tip portion 16a of the bending portion 16 like the roll-shaped folding. Accordingly, the second tether member 15 can be made as short as possible. For this reason, according to the present embodiment, the upper portion 111Db (see FIG. 14) of the curtain member 111 is folded in the bellows shape, thereby shortening the second tether member 15 properly.

Figure 17A:
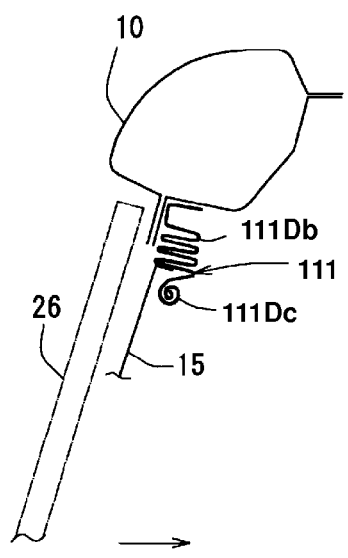
FIG. 17A is a schematic sectional view of the curtain member in the stored state.
Figure 17B:
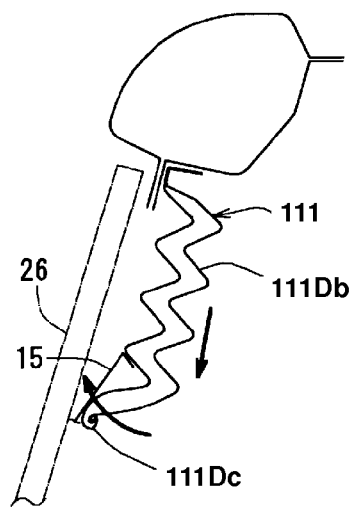
FIG. 17B is a schematic sectional view of the curtain member which is the process of inflation.
Figure 17C:
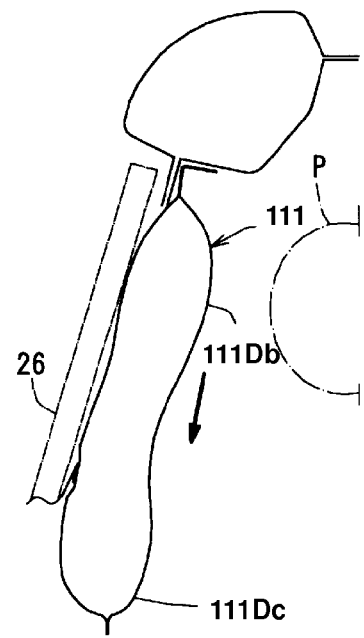
FIG. 17C is a schematic sectional view of the curtain member in the inflating state.

Meanwhile, the reason the lower portion 111Dc of the curtain member 111 is folded in the roll shape is to stabilize the inflation direction of the curtain member 111. This may be explained referring to FIGS. 17A, 17B and 17C showing the schematic sectional view of the curtain member. FIG. 17A is a schematic sectional view of the curtain member in the stored state; FIG. 17B is a schematic sectional view of the curtain member which is the process of inflation; and FIG. 17C is a schematic sectional view of the curtain member in the inflating state.

As shown in FIG. 17A, the curtain member 111 is folded in such a manner that the upper portion 111Db is folded in the bellows shape and the lower portion 111Dc is folded in the roll shape. In particular, the portion 111Dc is folded in the roll shape inwardly (in the counterclockwise direction in the figure). When the curtain member 111 inflates by receiving the gas supplied, the portion 111Dc folded in the bellows shape moves downward and inflates accordingly. Herein, the portion 111Dc folded in the roll shape inflates outwardly (as shown by an arrow) because it is folded inwardly and thus a reaction due to the inflation acts on it. Herein, since the quarter-window glass 26 is provided on the outside, further outward inflation of the curtain member 111 is so restrained by this glass 26 that the curtain member 111 inflates downward along the quarter-window glass 26 subsequently. When the curtain member 111 has inflated completely as shown in FIG. 17C, it is positioned surely between the head of the passenger P. Accordingly, the inflation direction of the curtain member 111 can be stabilized by folding the curtain member 111 in the roll shape. According to the present embodiment, in particular, the lower portion 11Dc of the curtain member 111 is folded in the roll shape.

Further, since a worker may bend the bending portion 16 easily because of the roll-shaped folding of the curtain member 111, the attachment of the curtain member 111 may be facilitated. That is, in case the curtain member 111 is folded in the bellows shape in the vertical direction, the horizontal rigidity may increase, so that it may become difficult to bend the curtain member 111 horizontally. Herein, however, since the lower portion 111Dc of the curtain member 111 is folded in the roll shape, the above-described increase of the rigidity is reduced. Accordingly, the bending of the bending portion 16 can be made easier, thereby facilitating the attachment of the curtain member 111.

Embodiment 5

A fifth embodiment will be described refereeing to FIGS. 18 through 20. In the present embodiment, the second tether member 115 of the above-described third embodiment and the curtain member 111 which is folded in the same way as the above-described fourth embodiment are used. The same structure elements as those of the above-described third and fourth embodiments are denoted by the same reference characters, and those detailed descriptions will be omitted.

Figure 18:
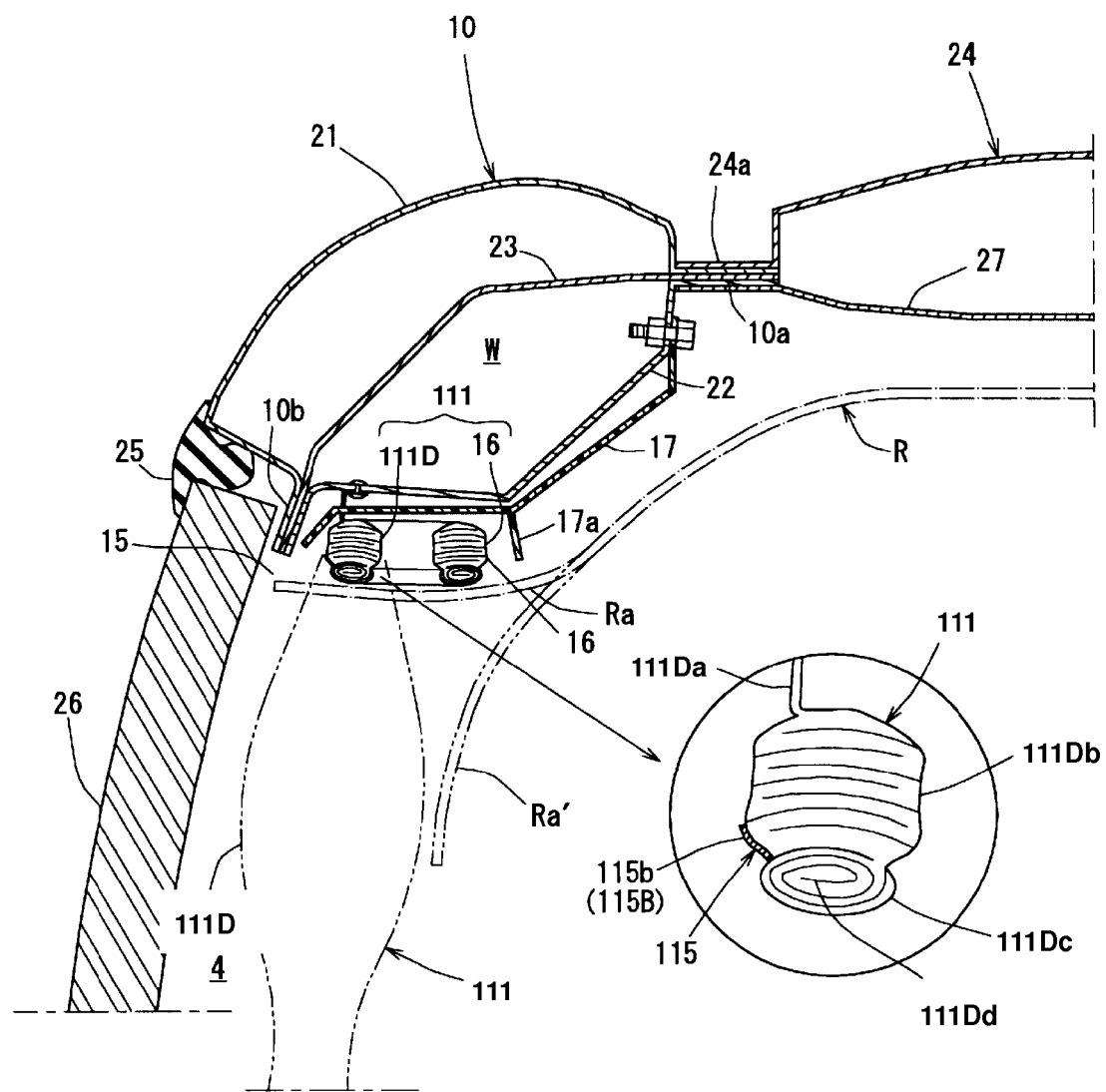
FIG. 18 is a sectional view according to a fifth embodiment, which corresponds to FIG. 4.
Figure 19:
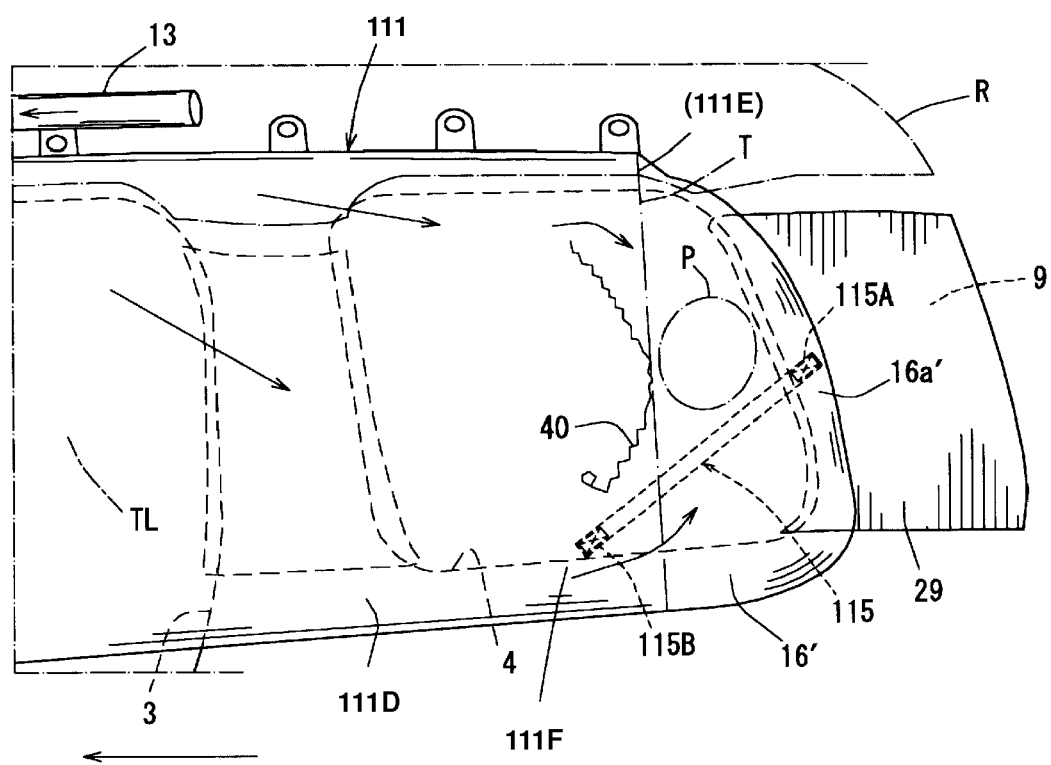
FIG. 19 is a side view which shows an inflating state of a curtain member according to the fifth embodiment.

That is, as shown in FIG. 18, the curtain member 111 of the present embodiment is also configured such that its upper portion 111Db is folded in the bellows shape and its lower portion 111Dc is folded in the roll shape. Herein, the one end 115b (first seam portion 115B) of the second tether member 115 is connected to the lower end of the portion 111Db which is folded in the bellows shape. Herein, the other end 115a (second seam portion 115A) of the second tether member 115 is also connected to the lower end of the portion 111Db which is folded in the bellows shape.

Figure 20A:
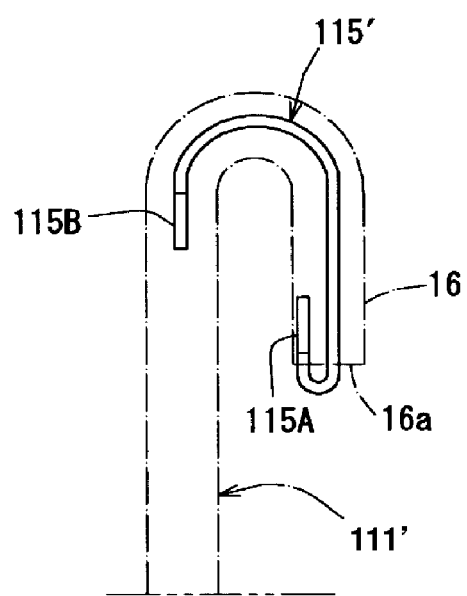
FIG. 20A is a schematic plan view which shows a disposition path of a second tether member in case the curtain is folded in a roll shape.
Figure 20B:
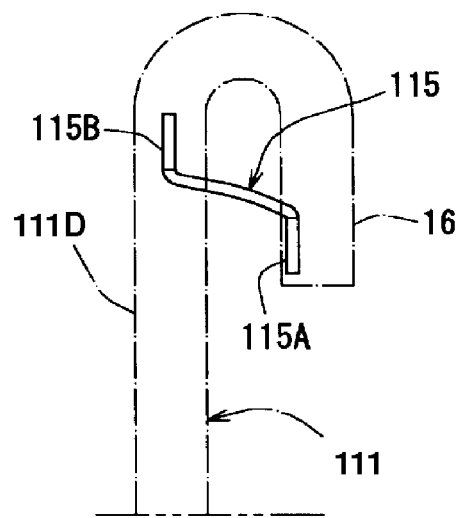
FIG. 20B is a schematic plan view which shows the disposition path of the second tether member in case the curtain is folded in a bellows shape.

Hereinafter, the reason the both ends of the second tether member 115 are fixed to the portion 111Db of the curtain member 111 will be described referring to FIGS. 20A and 20B. FIG. 20A is a schematic plan view which shows a disposition path of the second tether member in case the curtain is folded in the roll shape. FIG. 20B is a schematic plan view which shows the disposition path of the second tether member in case the curtain is folded in the bellows shape.

As shown in FIG. 20A, if a curtain member 111' is folded in the roll shape, a second seam portion 115B of a second tether member 115' is drawn into the curtain member 111' like the above-described fourth embodiment. Accordingly, in order that a first seam portion 115A of the second tether member 115' is fixed to the tip portion 16a of the bending portion 16 of the curtain member 111', the second tether member 115' may need to be turned back along the bending portion 16 once so as to be disposed inside the bending portion 16 and then need to be exposed to the outside for connection to the tip end 16a. Meanwhile, if the curtain member 111 is folded in the bellows shape as shown in FIG. 20B, the first seam portion 115A and the second seam portion 115B of the second tether member 115 are always exposed to the outside of the curtain member 111. Accordingly, the both ends 115A, 115B can be fixed to the body portion 111D and the bend portion 16 of the curtain member 111, by disposing the second tether member 115 outside the curtain member 111.

Thus, the disposition path of the second tether member 115 changes according to the folding configuration of the curtain member 111 in the present embodiment as well. Further, there is no need to make the second tether member go by way of the tip portion 16a of the bending portion 16 like the roll-shaped folding. Accordingly, the second tether member 115 can be made as short as possible as well. Therefore, according to the present embodiment as well, by folding the upper portion 111Db of the curtain member 111 in the bellows shape, the length of the second tether member 115 can be made short, thereby improving the function of the second tether member 115.

In correspondence of the present invention to the above-described fourth and fifth embodiments, the area of the curtain member which is from the upper-edge end to the specified portion of the curtain member which is connected by the connecting member, or the area of the curtain member which is from the upper-edge end to the portion which includes the first and second specified portions of the curtain member which are connected by the connecting member correspond to the above-described upper portion 111Db. Further, the area of the curtain member which is from the above-described area to the lower-edge end corresponds to the above-described lower portion 111Dc.

Embodiment 6

Figure 21:
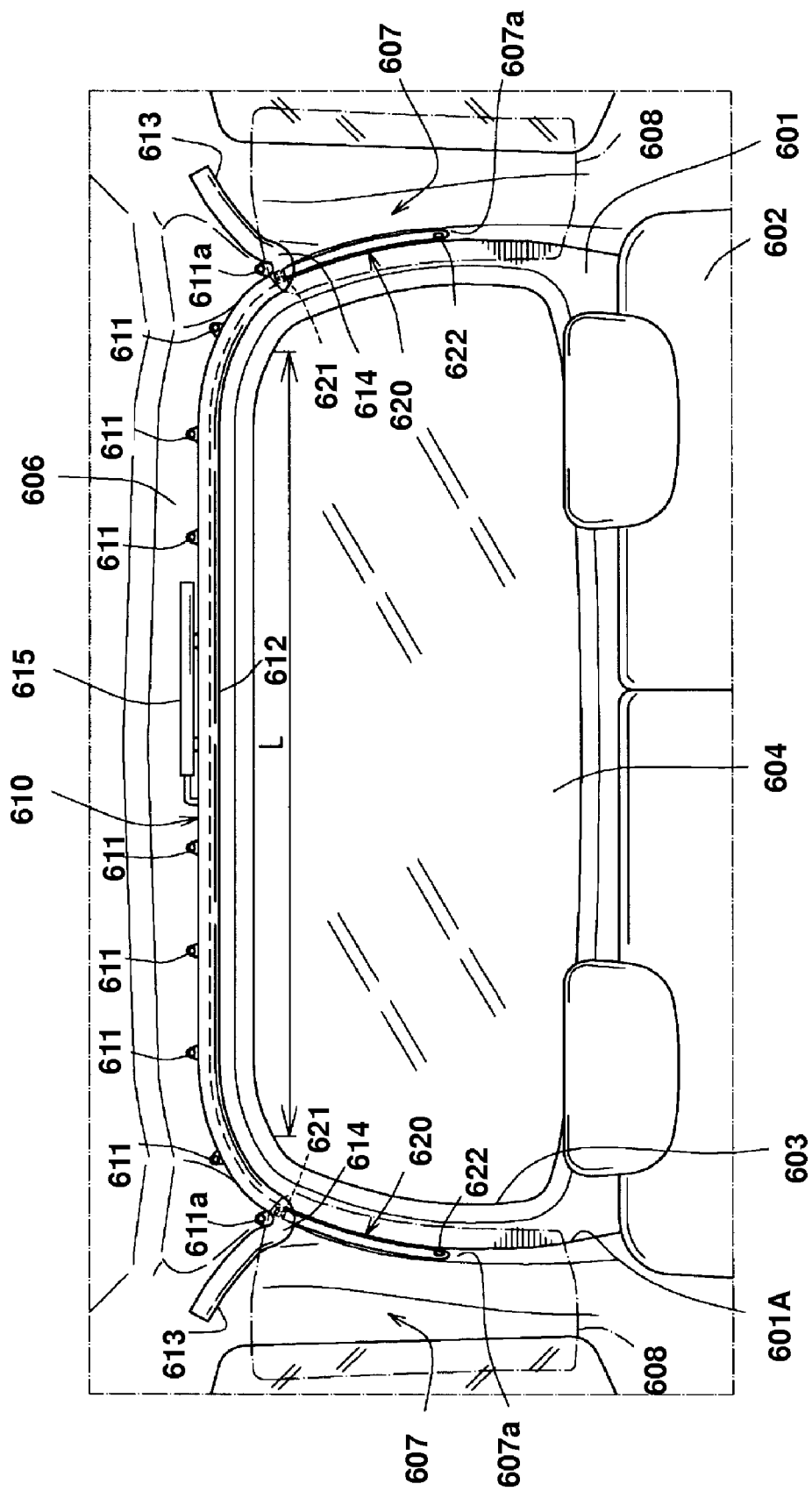
FIG. 21 is a rear schematic view of an interior structure according to a sixth embodiment of the present invention.
Figure 22:
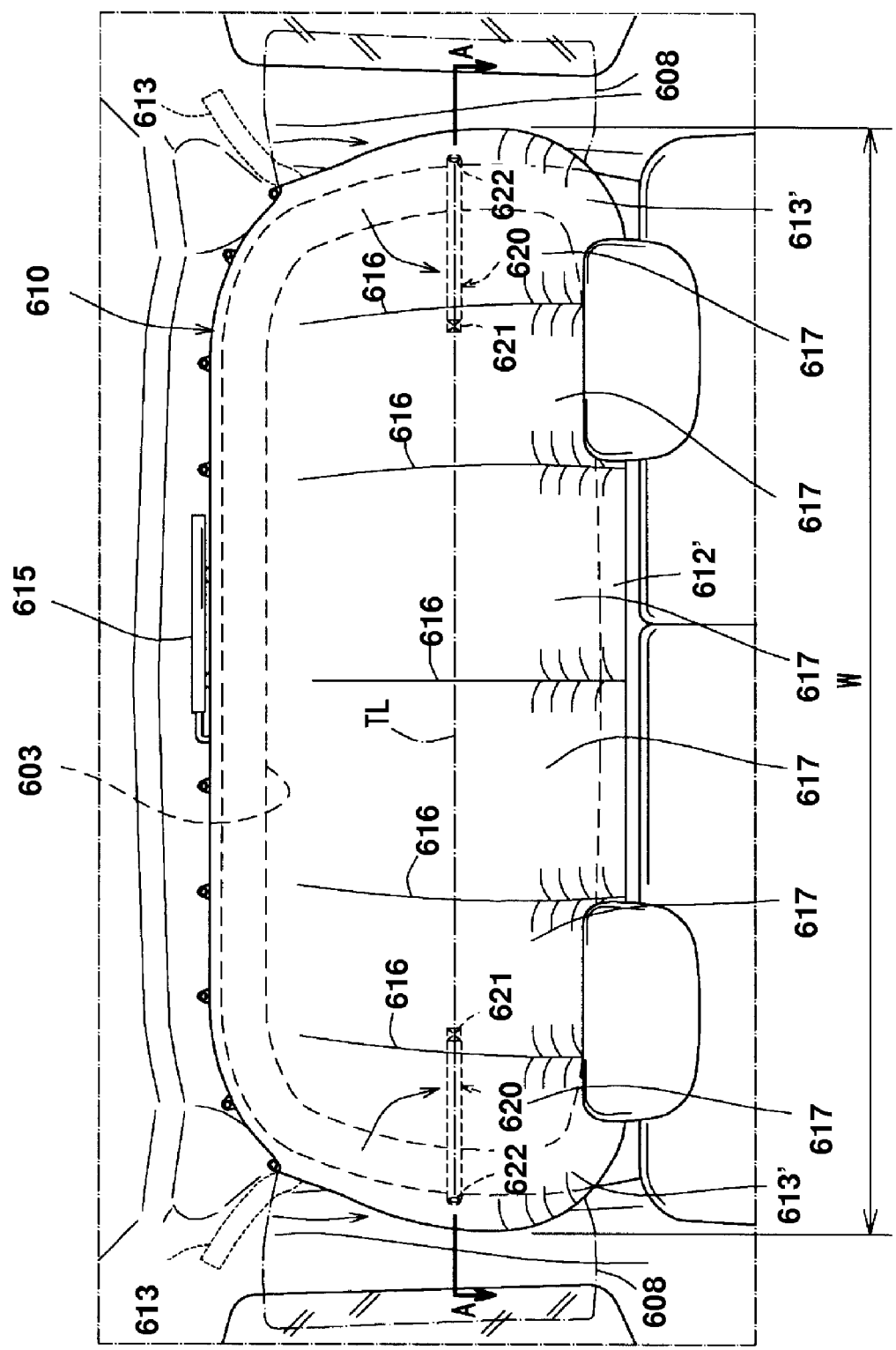
FIG. 22 is a rear schematic view of the interior structure in a state in which a curtain airbag device inflates.
Figure 23:
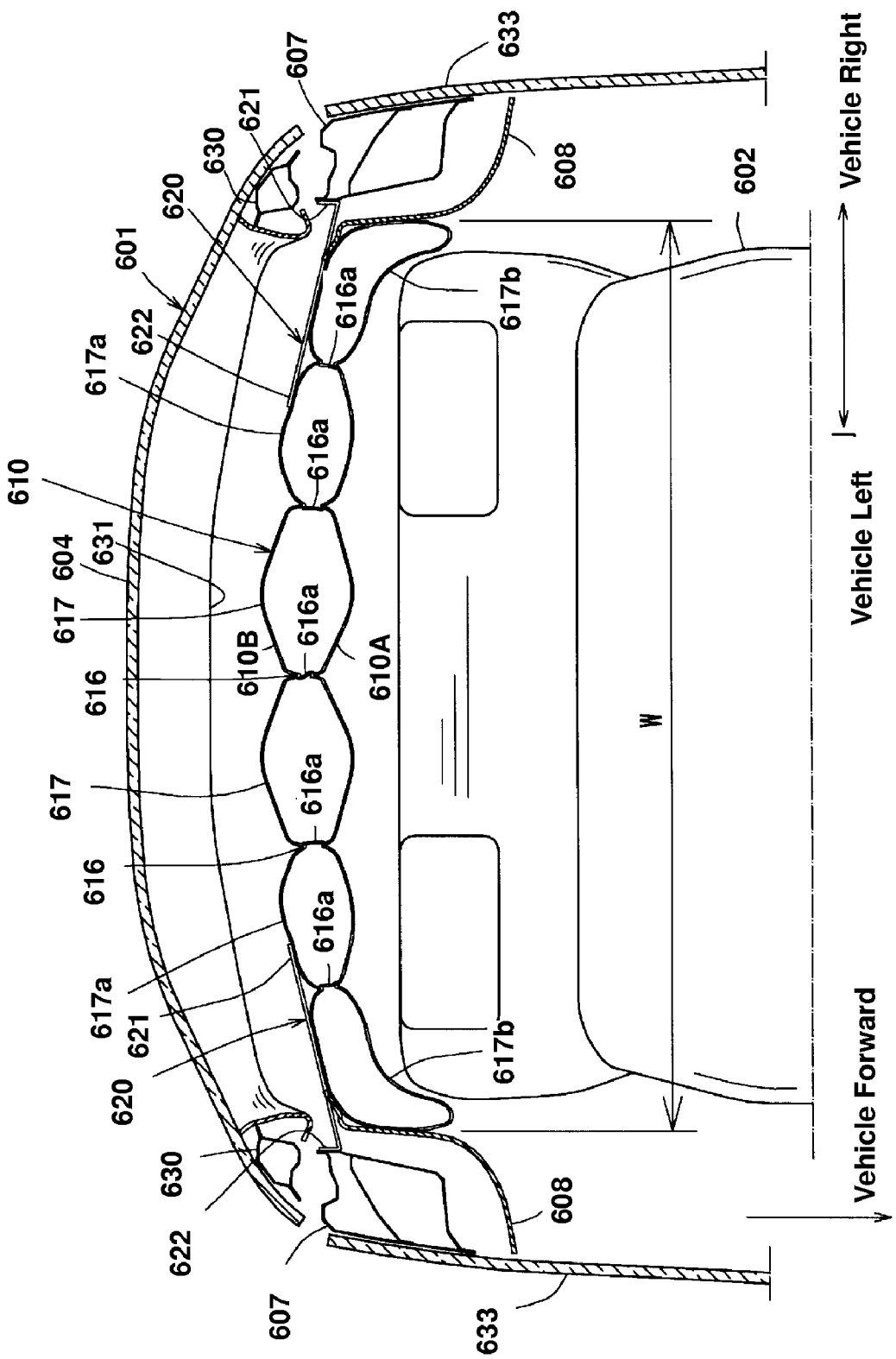
FIG. 23 is a sectional view taken along line A-A of FIG. 22.

A sixth embodiment will be described referring to FIGS. 21 through 27. FIG. 21 is a rear schematic view of an interior structure according to the present embodiment of the present invention. FIG. 22 is a rear schematic view of the interior structure in a state in which a curtain airbag device inflates. FIG. 23 is a sectional view taken along line A-A of FIG. 22.

A vehicle equipped with the interior structure according to the sixth embodiment is, as shown in FIG. 21, a minivan type of vehicle which is equipped with a back door 601 at a vehicle rear portion. A baggage compartment is integrally formed with the vehicle compartment so that a rearmost seat 602 is provided before the back door 601. The back door 601 is supported around a door hinge (not illustrated) so as to rotate vertically, opening and closing a back-door opening 601A at the vehicle rear portion. Further, at an upper half of the back door 601 is formed a back-window opening (rear opening) 603 is of a trapezoid shape with a long lower side. A back-window glass 604 is fixed to the back-window opening 603. Thus, the vehicle rear portion is separated off the outside by the back-window glass 604.

A curtain member 610 in its stored state is provided at an upper peripheral portion of the back-door opening 601A so as to extend in a vehicle width direction. This curtain member 610 inflates downward so as to cover the upper half of the back-door opening 601A from the inside of the vehicle compartment when a vehicle rear collision is detected. Herein, FIG. 21 shows a state in which a roof trim 605 (see FIG. 24) which forms a vehicle ceiling portion is removed in order to apparently illustrate the curtain member 610 and others. The roof trim 605 is made of a soft resin board as described later, so that it can be easily deformed when the curtain member 610 inflates.

The curtain member 610 is only fixed to an upper peripheral portion 606 firmly via plural attaching flanges 611 . . . 611. The width of the curtain member 610 is slightly greater than the length L of an upper side of the back-window opening 603. The curtain member 610 has a body portion 612 at its middle portion and a pair of bending portions 613, 613 at its both-side ends. Each bending portion 613 has a bend portion 614 which bends downward slightly. The bend portions 614, 614 area fixed to the vehicle body via flanges 611a, 611a. The bending portions 613, 613 are provided at upper portions of D pillars 607, 607 which extend vertically to form both-side edges of the back-door opening 601A so as to be directed forward of the vehicle.

An inflator 615 which supplies gas to the curtain member 610 is provided at the central portion above the curtain member 610 so as to extend in the vehicle width direction. This inflator 615 generates the gas to be supplied to the curtain member 610 when receiving an operational signal from a controller, not illustrated. A tether member 620 which is of a string shape and extends vertically is provided between the curtain member 610 and a middle portion 607a of the D pillar 607. This tether member 620 connects the curtain member 610 to the D pillar 607 in such a manner that its upper end (one end) 621 is fixed to the bend portion 614 of the curtain member 610 and its lower end (the other end) 622 is fixed to a lower-side position 607a of the D pillar 607 which is slightly below the middle position of the pillar 607. Herein, on the vehicle-compartment inside is provided a pillar trim 608 which covers the D pillar 607 and the tether member 620 as illustrated by a one-dotted broken line. The pillar trim 607 is made from hard synthetic resin, such as polypropylene resin, to from a wall face of a baggage compartment provided at the vehicle rear portion, so that the pillar trim 607 is not easily deformed like the roof trim 605. Thus, most of the curtain member 610 is covered with the roof trim 605 and the tether member 620 is covered with the pillar trim 608 when the curtain member 610 is stored, so that the curtain airbag device is not visible from the vehicle-compartment inside (see FIG. 24).

When the curtain airbag device operates and the gas is supplied to the curtain member 610 as shown in FIG. 602, the curtain member 610 inflates into the vehicle compartment. In this case, a portion 612' which corresponds to the body portion 612 and a portion 613' which corresponds to the bending portion 613 inflate downward from the stored state so as to cover the back-window opening 603 completely. Particularly, the portion 613' of the curtain member 610 which corresponds to the bending portion 613 inflates so as to cover part of the pillar trim 608, so that the rear portion of the vehicle compartment can be covered with the curtain member 610 completely. Herein, the curtain 610 is made of a bag-shaped cloth member so as to inflate largely when receiving the gas supplied therein.

Further, the curtain member 610 comprises five separate seam portions 616 . . . 616 which extend vertically from its lower end to its upper middle position. The five vertical seam portions 616 . . . 616 divide the curtain member 610 into six split cylindrical portions 617 . . . 617. Upper portions of the split cylindrical portions 617 . . . 617 are interconnected. Thereby, when inflating, the curtain member can have a proper rigidity in the vertical direction and a shorter width W than that when not inflating. That is, as shown in FIG. 23, the curtain member 610 inflates with the separated six cylindrical portions 617 . . . 617 in the vehicle width direction, so that the width W becomes shorter when it inflates. Herein, while the above-described vertical seam portions 616 which separate the slit cylindrical portions 617 are made by seaming cloth members 616a to the inside of the curtain member 610, they may be made by seaming an outer cloth member 610A to an inner cloth member 610B without using the cloth members 616a.

Further, the tether member 620 is connected to the bend portion 614 at its one end 621 (see FIG. 21), so that when the curtain member 610 inflates, this end 621 moves the outside which corresponds to the bend portion 614 to the position of the second split cylindrical portion 617a. Thus, the tether member 620 moves in such a manner that it falls down inward with a move center at the other end 622 (see FIG. 22) and supports the curtain member 610. Herein, the operation when the tether member 620 gets (inflates) out of the pillar trim 608 will be described later. Since the width W of the curtain member 610 becomes shorter as it inflates as described above, a tension is generated at the tether member 620 in the vehicle width direction. Thereby, a tension line L which extends in the vehicle width direction is formed surely at the curtain member 610 at a position which interconnects both-side attaching positions 607a, 607a of the right and left tether members 620, 620 to the D pillars 607, 607 as shown in FIG. 22.

Further, as shown in FIG. 23, the curtain member 610 is provided so as to inflate surely between the rear seat 602 and the back door 601. The split cylindrical portions 617b, 617b inflate between the rear seat 602 and the pillar trims 608 of the D pillars 607. Further, the tether members 620 is provided so as to inflate on the outside (rearward) of the curtain member 610 as well. Accordingly, a passenger (not illustrated) who is seated in the rear seat 602 can be protected by the inflating curtain member 610 surely by preventing contact not only with the back door 601 but the pillar trim 608 and tether member 620. The surrounding vehicle-body structure will be described. As shown in FIG. 23, the back door 601 comprises right and left window-frame pillars 630 and a back-door trim 631 which is made from synthetic resin on its inside. The above-described back-window glass 604 is fixed to the outside (rear side) of the window-frame pillars 630. Further, the other end 622 of the tether member 620 is fixed to the D pillar 607, and a quarter-window glass 633 is fixed to the outside of the D pillar 607.

Figure 24:
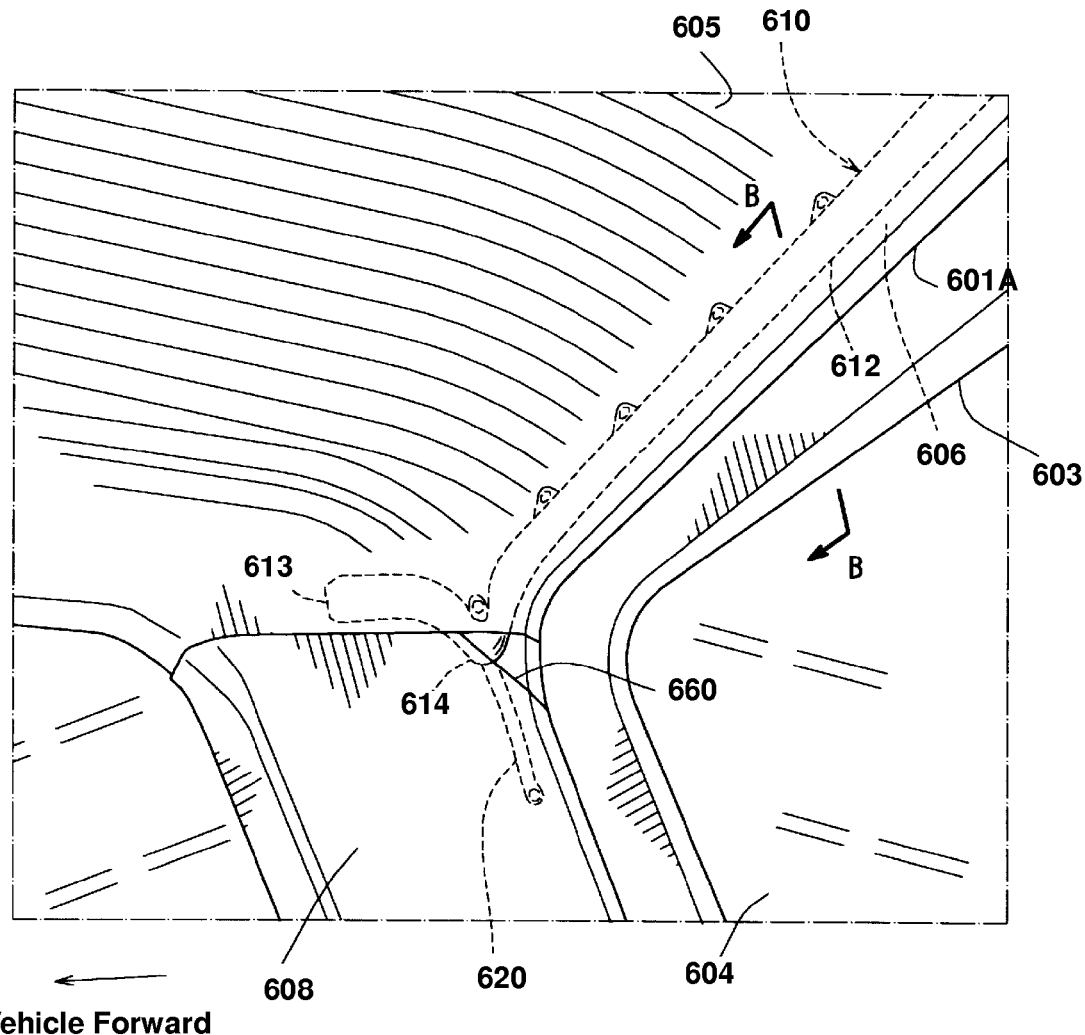
FIG. 24 is a perspective view of a rear upper portion of the vehicle compartment which shows a bending portion of the curtain member primarily.
Figure 25:
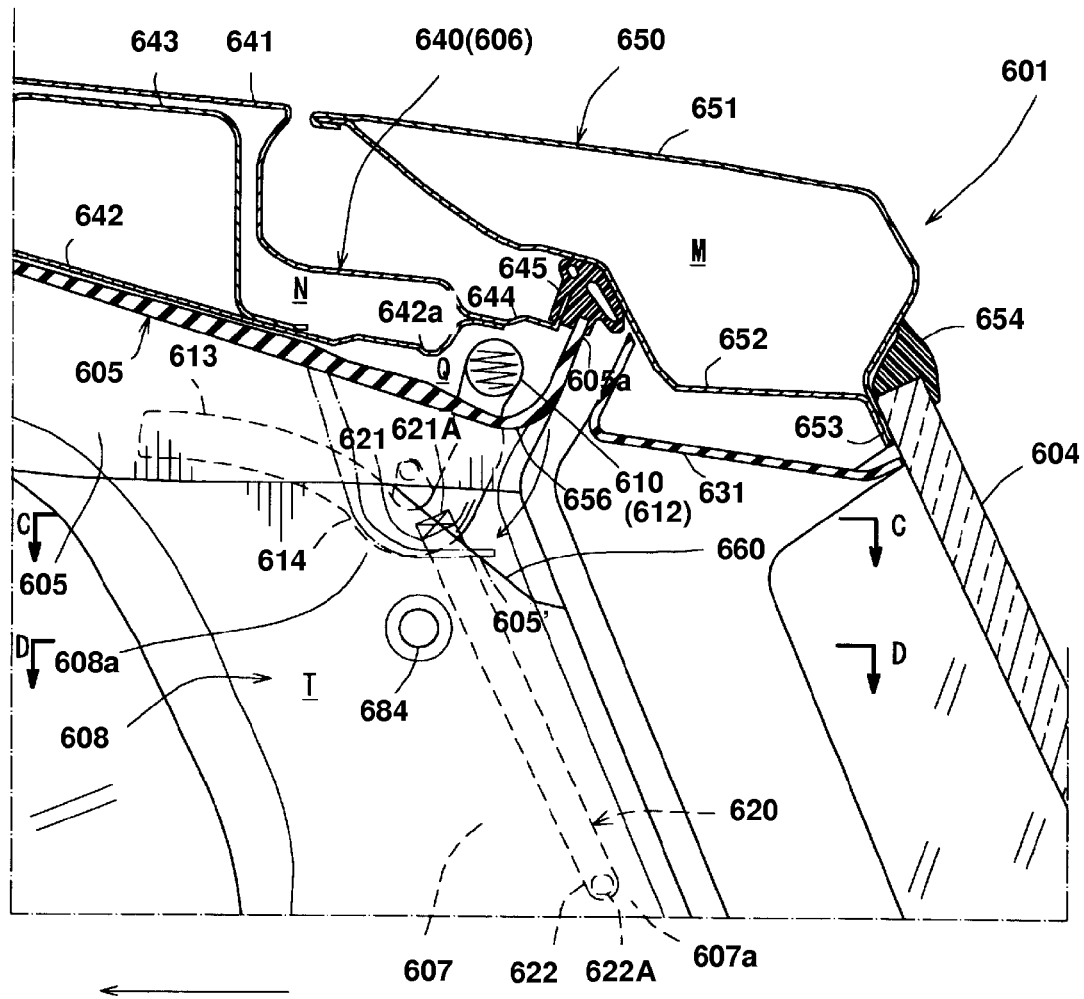
FIG. 25 is a sectional view taken along line B-B of FIG. 24.
Figure 26:
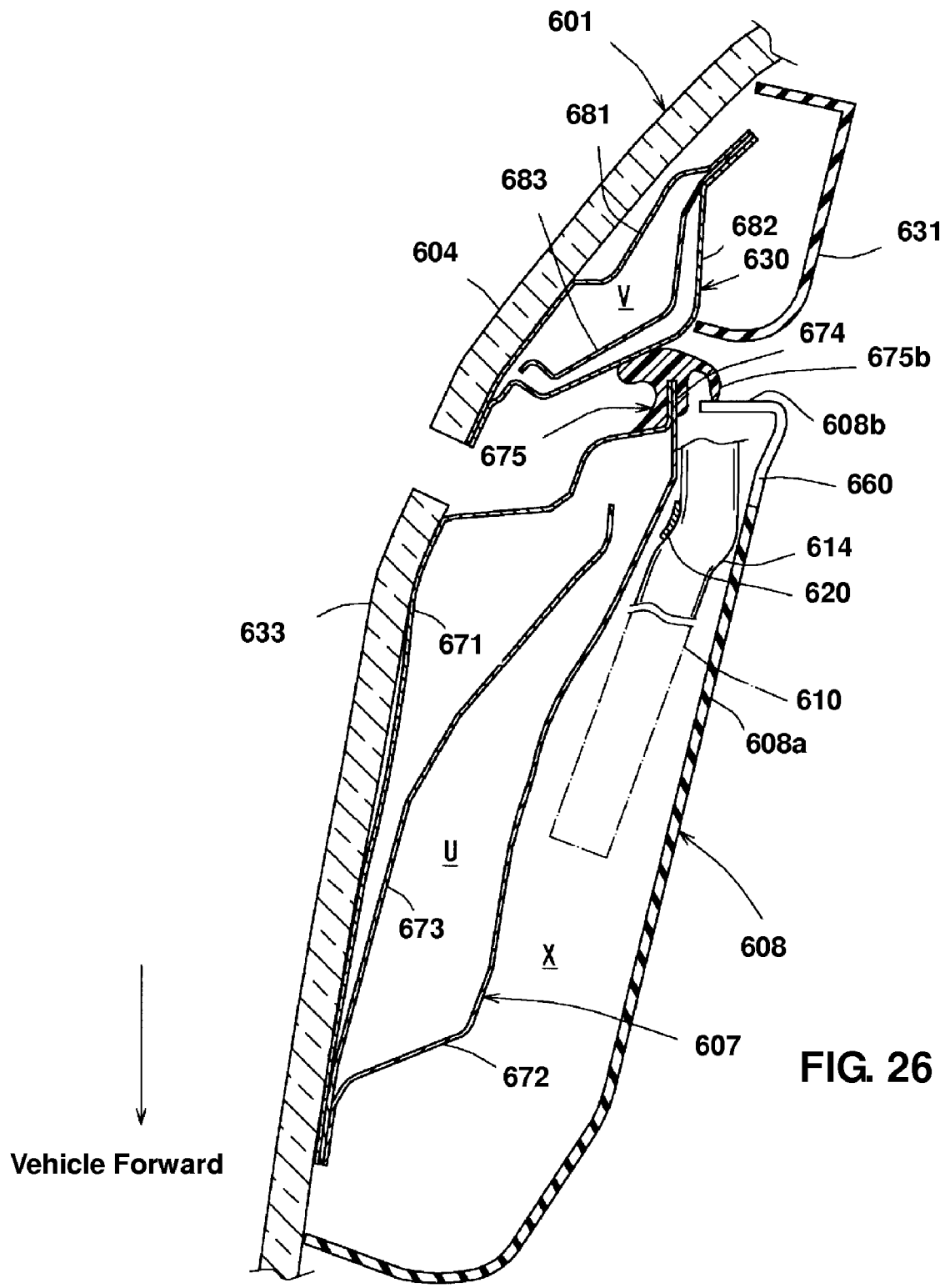
FIG. 26 is a sectional view taken along line C-C of FIG. 25.
Figure 27:
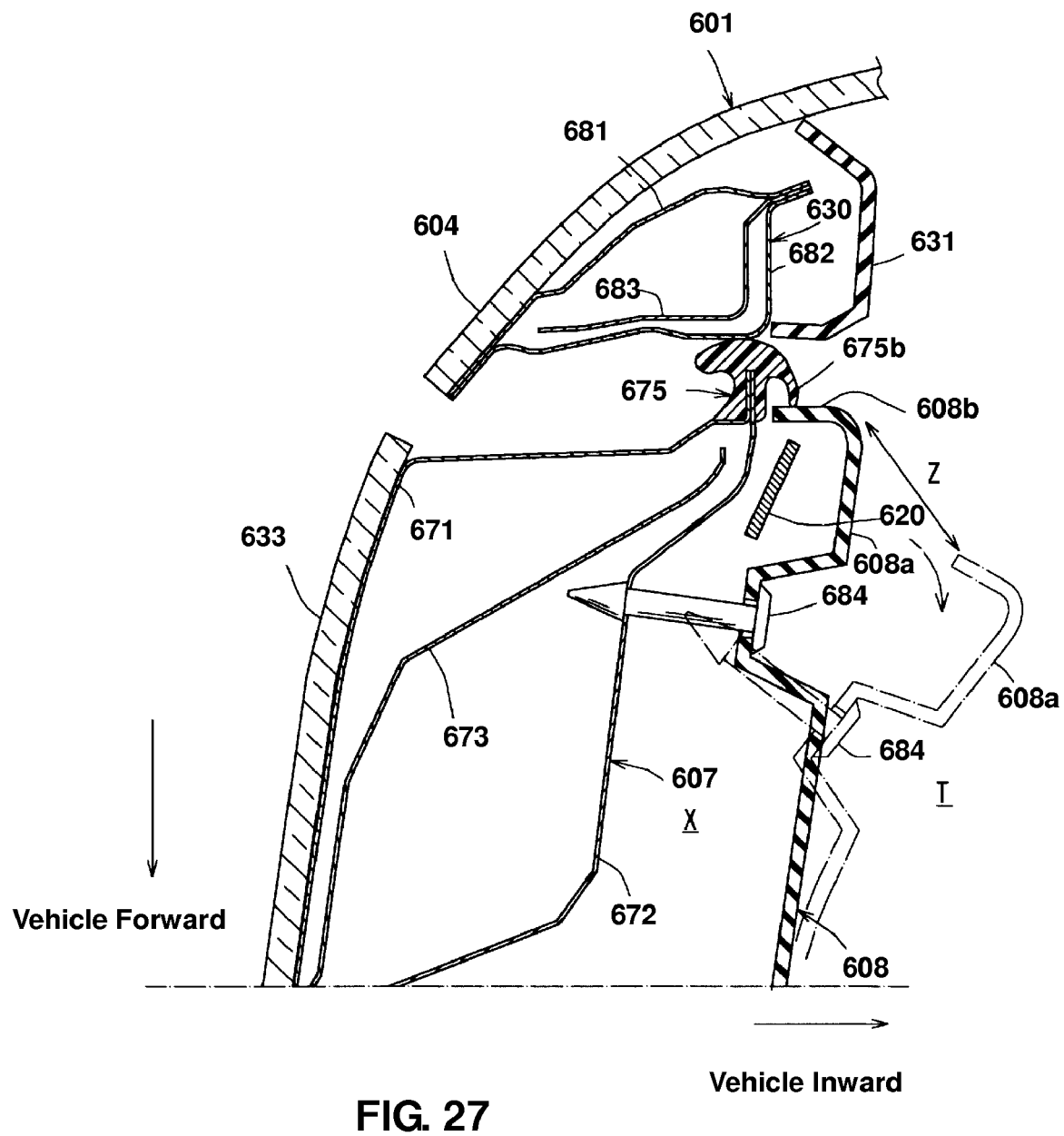
FIG. 27 is a sectional view taken along line D-D of FIG. 25.

Hereinafter, the detained structure of the curtain member and others will be described referring to FIGS. 24 through 27. FIG. 24 is a perspective view of the rear upper portion of the vehicle compartment which shows the bending portion of the curtain member primarily. FIG. 25 is a sectional view taken along line B-B of FIG. 24. FIG. 26 is a sectional view taken along line C-C of FIG. 25. FIG. 27 is a sectional view taken along line D-D of FIG. 25.

The curtain member 610 is provided so that its body portion 612 extends in the vehicle width direction at an upper edge portion 606 of the back-door opening 601A as shown in FIG. 24. Specifically, as shown in FIG. 25, it is disposed below a rear header 640 which extends in the vehicle width direction to form the upper end portion 606 of the back-door opening 601A. The rear header 640, as a rigidity member provided at the vehicle upper rear end, forms a closed cross section N which extends in the vehicle width direction with a vehicle-body outer panel 641 and a vehicle-body inner panel 642. A reinforcement member 643 is disposed in its inside. Further, a weather strip member 645 which is made from rubber and extends in the vehicle width direction is fixed to a rear-end flange 644 of the rear header 640. This weather strip member 645 comes to contact an upper window-frame member 650 of the back door 601 at its rear-end face, so that the sealing can be ensured for the vehicle compartment T when the back door 601 is closed.

The upper window-frame member 650 has a closed cross section M which extends in the vehicle width direction, which is formed by a door outer panel 651 and a door inner panel 652 which are joined to each other. An upper end 604a of the back-window glass 604 is supported at a rear joining flange 653. The back-window glass 604 is fixed via a mole-shaped seal member 654. Further, a back-door trim 631 which forms an inside wall of the back door 601 is attached below the upper window-frame member 650. The roof trim 605 which forms the ceiling portion of the vehicle is provided on the front side of the vehicle so as to face to the back-door trim 631. The roof trim 605 is made of the relatively soft resin board so that it can be deformed easily when the curtain member 610 inflates as described above (see a one-dotted broken line denoted by a reference numeral 605'). Further, the roof trim 605 has a corner portion 656 which can be deformed upward at its rear portion, and the body portion 612 of the curtain member 610 is folded in the bellows shape or the like so as to be stored in a storage space Q above the corner portion 656. This storage space Q is formed by a rear portion 642a of the vehicle-body inner panel 642 which projects upward. A rear end portion 605a of the roof trim 605 is inserted for fixation into the weather strip member 645 which is fixed to the rear header 640, and when the curtain member 610 inflates, this insertion for fixation is configured to be released. Thus, the curtain member 610 can be made inflate into the vehicle compartment surely without causing any breakage of the roof trim 605.

The bending portion 613 of the curtain member 610 is disposed as shown in FIG. 25 in such a manner that the bend portion 614 lowers to an upper end portion 608a of the pillar trim 608 once and then rises toward the roof trim 605 so as to be directed forward. That is, part of the bend portion 613 (bend portion 614) is disposed near the upper end portion 608a of the pillar trim 608, while most part of the bend portion 613 is positioned on the side of the roof trim 605. Thereby, the inflation pressure of the curtain member 610 can act on the pillar trim 608 as well as the roof trim 605 when the curtain member 610 inflates.

Further, the second tether member 620 which connects the curtain member 610 to the D pillar 607 extends substantially vertically obliquely inside the pillar trim 608 in such a manner that its upper end 621 is fixed to the bend portion 614 of the curtain member 610 via a seam portion 621A and its lower end 622 is fixed to the lower-side position 607a of the D pillar 607 via a fixing pin 622A. Further, a notch portion 660 is formed in a slant shape at a rear portion of the upper end portion 608a of the pillar trim 608. This notch portion 660 can reduce pressures which may act from the curtain member 610 and the second tether member 620 when the curtain member 610 inflates, so that it can be prevented that any stress occurs at the pillar trim 608 and thereby the breakage of the pillar trim 608 and the like can be properly prevented. That is, since the pillar trim 608 is made of the hard synthetic resin such as polypropylene resin as described above, there is a concern that it may be easily broken when it is deformed at a low temperature. Accordingly, the above-described notch portion 660 is formed at the rear portion of the upper end portion 608a of the pillar trim 608 where the stress may occurs the most easily, so the breakage of the pillar trim 608 can be prevented properly.

Hereinafter, the specific structures of the D pillar 607 and the pillar trim 608 will be described referring to FIGS. 26 and 27. The D pillar 607 has a closed cross section U which extends vertically at the outward end position, which is formed by a pillar outer panel 671 and a pillar inner panel 672 which are joined to each other as shown in FIG. 26. A pillar reinforcement 673 which extends in the vehicle longitudinal direction is provided inside the closes cross section U, so that the rigidity of the D pillar 607 can be properly increased. The above-described quarter-window glass 633 which extends in the vehicle longitudinal direction is attached at an outside face of the D pillar 607. Further, a weather strip member 675 which is made of rubber and extends vertically is fixed to a rear-end flange 674 of the D pillar 607. This weather strip member 675 comes to contact a window-frame pillar portion 630 of the back door 601 at its rear-end face, like the above-described weather strip member 645, so that the sealing can be ensured for the vehicle compartment T. The window-frame pillar portion 630 has a closed cross section V which extends vertically, which is formed by a door outer panel 681 and a door inner panel 682 which are joined to each. A window-frame reinforcement member 683 is provided inside the closes cross section V, so that the rigidity of the D pillar 607 can be properly increased. The back-window glass 604 is attached at an outside face of the window-frame pillar portion 630. Herein, a reference numeral 631 denotes a back-door trim.

The pillar trim 608 is positioned on the inside of the D pillar 607 and fixed via a clip 684 or the like as shown in FIG. 27. Further, the pillar trim 608 has a vertical wall portion 608b which has an L-shaped cross section and faces to the back door 601 at its rear portion. This vertical wall portion 608b increases the rigidity so that the pillar trim 608 is not deformed even when any baggage hits against the pillar trim 608 at a baggage loading. The vertical wall portion 608b is fixed via a lip portion 675b of the weather strip member 675. Herein, inside a space X between the pillar trim 608 and the D pillar 607 is disposed the second tether member 620 and the bend portion 614 of the curtain member 610 as shown in FIGS. 26 and 27. Accordingly, in case the curtain member 610 inflates, it may be necessary that the pillar trim 608 is so deformed that the second tether member 620 can inflate into the vehicle compartment T.

Since the bend portion 614 is disposed near the upper end portion 608a of the pillar trim 608 as described above according to the present embodiment, the bend portion 614 of the curtain member 610 pushes the upper end portion 608a of the pillar trim 608 inward so that the upper end portion 608a moves away from the D pillar 607 (see the illustration by the one-dotted broken line). This move (deformation) of the pillar trim 608 causes the clip 684 to be released as shown in FIG. 27, so that the move of the pillar trim 608 can be ensured even if the pillar trim 608 is made from hard synthetic resin. Thus, the pillar trim 608 moves away from the D pillar 607, and thereby the fixing of the vertical wall portion 608b of the pillar trim 608 by the weather strip member 675 is released, so that a gap Z occurs between the D pillar 607 and the vertical wall portion 608b. Accordingly, the second tether member 620 can get out (inflate) into the vehicle compartment T surely by using the gap Z even if the pillar trim 608 is made of hard synthetic resin. Thus, according to the present embodiment, the curtain member 610 inflates into the vehicle compartment, deforming the relatively soft roof trim 605 easily, and the second tether member 620 inflates into the vehicle compartment, moving the relatively hard pillar trim 608 slightly. Thereby, the curtain member 610 can be made inflate into the vehicle compartment T without generating the large stress at the pillar trim 608.

Hereinafter, the operation and effects of the present embodiment will be described.

According to the present embodiment, the curtain member 610 in the stored state has the bending portions 613 at its both sides, which are disposed between the roof trim 605 and the vehicle body (D pillars 607), and the tether members 620 connect the curtain member 610 to the D pillars 607. Thereby, only the second tether member 620 gets out of the pillar trim 608 into the vehicle compartment substantially when the curtain member 610 inflates. Accordingly, the curtain member 610 can inflate into the vehicle compartment without applying the large stress to the pillar trim 608. Further, since the curtain member 610 is connected to the D pillar 607 via the second tether member 620, the tension line TL can be properly formed at the curtain member 610 in the vehicle width direction. Thus, in the interior structure of the vehicle equipped with the curtain airbag, the curtain member 610 can be made inflate so as to cover the back-window opening 603 at the vehicle rear portion, and the tension line TL can be properly formed at the curtain member 610 in the vehicle width direction without causing any large deformation or breakage to the pillar trim 608 at the D pillar 607. Therefore, even if the pillar trim 608 is made of the hard resin member, the curtain member having the tension line TL in the vehicle width direction can be made inflate properly at the vehicle rear portion. Herein, the second tether member 620 may be made of any type of member other than the band-shaped one, such as a string-shaped one, a cloth-shaped one, or a belt-shaped part which is formed integrally with the curtain member 610.

Further, according to the present embodiment, there is provided the notch portion 660 which restrains the deformation amount of the pillar trim 608 at the rear portion of the upper end portion 608a of the pillar trim 608. Thereby, even if the second tether member 620 or the curtain member 610 contact the pillar trim 608 when the curtain member 610 inflates, the stress which may generate at the pillar trim 608 can be reduced. Accordingly, the breakage or the like of the pillar trim 608 can be prevented, and since no loss of the inflation force of the curtain member 610 may occur, reduction of the inflation force can be avoided, so that the proper inflation of the curtain member 610 can be ensured. Thus, the back-window opening 603 can be covered with the curtain member 610 surely, thereby improving the stability of the inflation of the curtain member 610.

Moreover, according to the present embodiment, the bend portion 614 of the curtain member 610 in the stored state is positioned between the rear portion of the upper end portion 608a of the pillar trim 608 and the D pillar 607. Thereby, the upper end portion 608a of the pillar trim 608 can be deformed so as to move away from the D pillar 607 by the inflation force of the curtain member 610 when the curtain member 610 inflates. Accordingly, the gap Z between the pillar trim 608 and the D pillar 607 generates, so that the second tether member 620 which is covered with the pillar trim 608 can be easily made get out into the vehicle compartment. Thus, the inflation of the second tether member 620 can be improved. Therefore, even if the pillar trim 608 us made of the hard resin member, the second tether member 620 can get out into the vehicle compartment easily, so that the stability of the inflation of the curtain member 610 can be further improved.

Further, according to the present embodiment, the connecting (fixing) position of the second tether member 620 to the curtain member 610 is set at the bend portion 614 which is located between the pillar trim 608 and the D pillar 607. Thereby, the second tether member 620 can be made short and also its connection (fixing) position (607a) to the D pillar 607 can be set at a relatively low level. Accordingly, the connection (fixing) position (622) of the second tether member 620 to the vehicle body, which becomes a basic point of the tension line TL, is set at the relatively low portion of the D pillar 607, and also the tension line TL can be formed at the curtain member 610 surely.

Moreover, according to the present embodiment, the vertical wall portion 608b which has the substantially L-shaped cross section is provided at the rear end of the pillar trim 608 so as to face to the back door 601 in the plan view. Thereby, even if interference of any baggage with the pillar trim 608 occurs at baggage loading, it can be prevented that the pillar trim 608 is deformed easily. Accordingly, the proper inflation of the curtain member 610 can be ensured and also the proper rigidity of the pillar trim 608 as a wall face of the baggage competent can be provided.

Further, according to the present embodiment, the bending portion 613 is provided near the upper end portion of the D pillar 607 so as to be directed forward. Thereby, there is no need to make a disposition space for the bending portion 613 on the side of the rear header 649 at the upper edge portion 605 of the back-window opening 603. Further, since the bending portion 613 is provided near the upper end portion of the D pillar 607 so as to be directed forward, the bending portion 613 inflates so as to cover the D pillar 607 when the curtain member 610 inflates, not only the back-window opening 603 but the larger area of the vehicle rear portion. Thus, there is no need to make the disposition space for the curtain member 610 at the rear header 640 or the like, and storing the curtain member 610 can be easily achieved. The inflation function of the curtain member 610 and so the safety can be improved.

Embodiment 7

Figure 28:
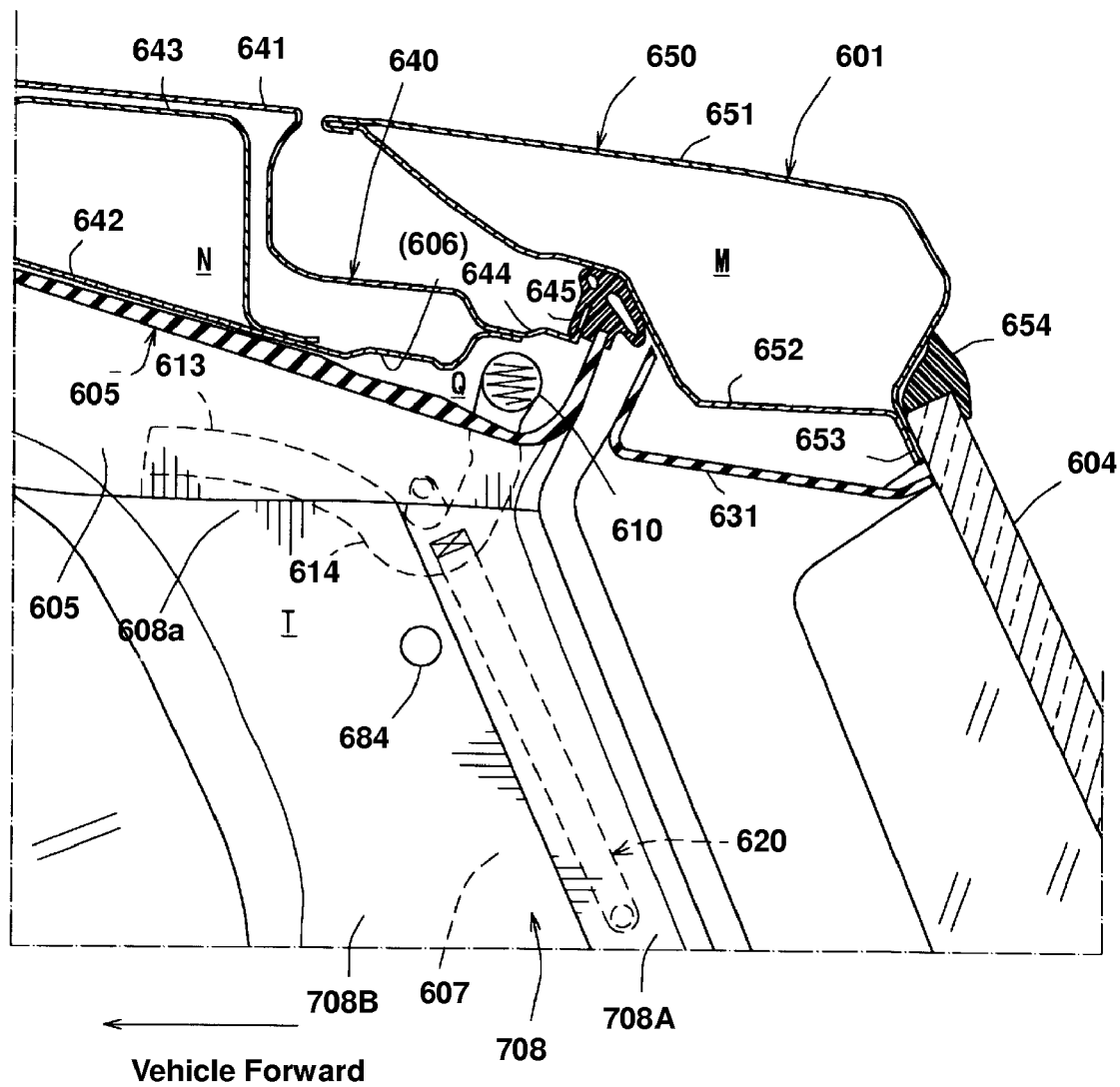
FIG. 28 is a sectional view taken along line B-B according to a seventh embodiment, which corresponds to FIG. 25.

A seventh embodiment will be described referring to FIG. 28. FIG. 28 is a sectional view taken along line B-B according to the seventh embodiment, which corresponds to FIG. 25. Herein, the same structure elements as those of the sixth embodiment are denoted by the same reference characters, and those detailed descriptions will be omitted.

According to the present embodiment, a rear half part 708A of a pillar trim 708 of the D pillar 607 is made from relatively soft synthetic resin, such as TPO (thermoplastic polyolefin) resin, so as to reduce the stress which may generate at the pillar trim 708. Specifically, a front half part 708B of the pillar trim 708 is made from the PP (polypropylene) resin, and the rear half part 708A is made from the TPO resin, so that the front half part 708B is made hard and the rear half part 708A is made soft. Accordingly, the proper rigidity of the front half part 708B of the pillar trim 708 as the baggage wall face can be ensured. Meanwhile, the rear half part 708A of the pillar trim 708 can provide the proper inflation function of the second tether member 620 when the curtain member 610 inflates.

In particular, since the rear portion (708A) in back of the clip 684 is made from soft synthetic resin like the present embodiment, the second tether member 620 inflates into the vehicle compartment when the curtain member 610 inflates, without release of the clip 684. Thereby, the inflation function of the second tether member 620 can be improved more surely. Thus, the second tether member 620 gets out of the pillar trim 708 into the vehicle compartment more easily than the above-described sixth embodiment. Accordingly, the curtain member 610 can be made inflate more properly without losing the inflation force, so that the stability of the inflation of the curtain member 610 can be improved.

Embodiment 8

Figure 29:
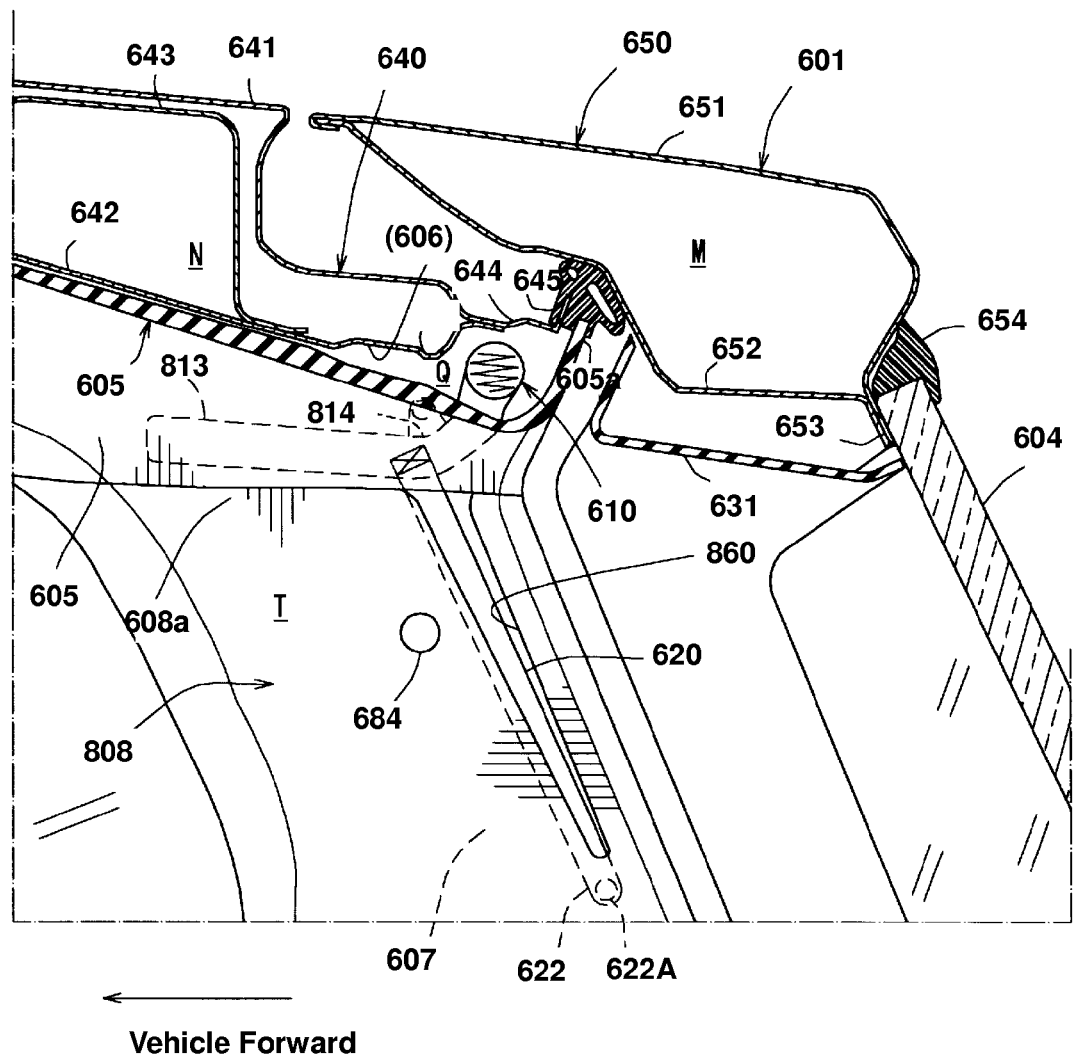
FIG. 29 is a sectional view taken along line B-B according to an eighth embodiment, which corresponds to FIG. 25.

An eighth embodiment will be described referring to FIG. 29. FIG. 29 is a sectional view taken along line B-B according to the eighth embodiment, which corresponds to FIG. 25. Herein, the same structure elements as those of the sixth embodiment are denoted by the same reference characters, and those detailed descriptions will be omitted.

According to the present embodiment, a slit 826 is formed at the rear portion of a pillar trim 808 of the D pillar 607 so as to extend vertically, and the second tether member 620 gets out of the slit 860 into the vehicle compartment. Specifically, this slit 860 is disposed so as to overlap with the second tether member 620 in a side view so that the second tether member 620 can gets out of the slit 860 into the vehicle compartment surely. Further, a bend portion 814 of a bending portion 813 is disposed on the side of the roof trim 605 so as to be away from the pillar trim 808 because it is not necessary for the curtain member 610 to apply the pressure to pillar trim 808. Accordingly, the disposition of the curtain member 610 in the stored state can be facilitated and the attachment of the curtain member 610 can be made easier as well. Thus, the second tether member 620 can be made get into the vehicle compartment without moving or deforming the pillar trim 808 at all. Accordingly, the curtain member 610 can be made inflate more properly without losing the inflation force further, so that the stability of the inflation of the curtain member 610 can be improved.

Embodiment 9

Figure 30:
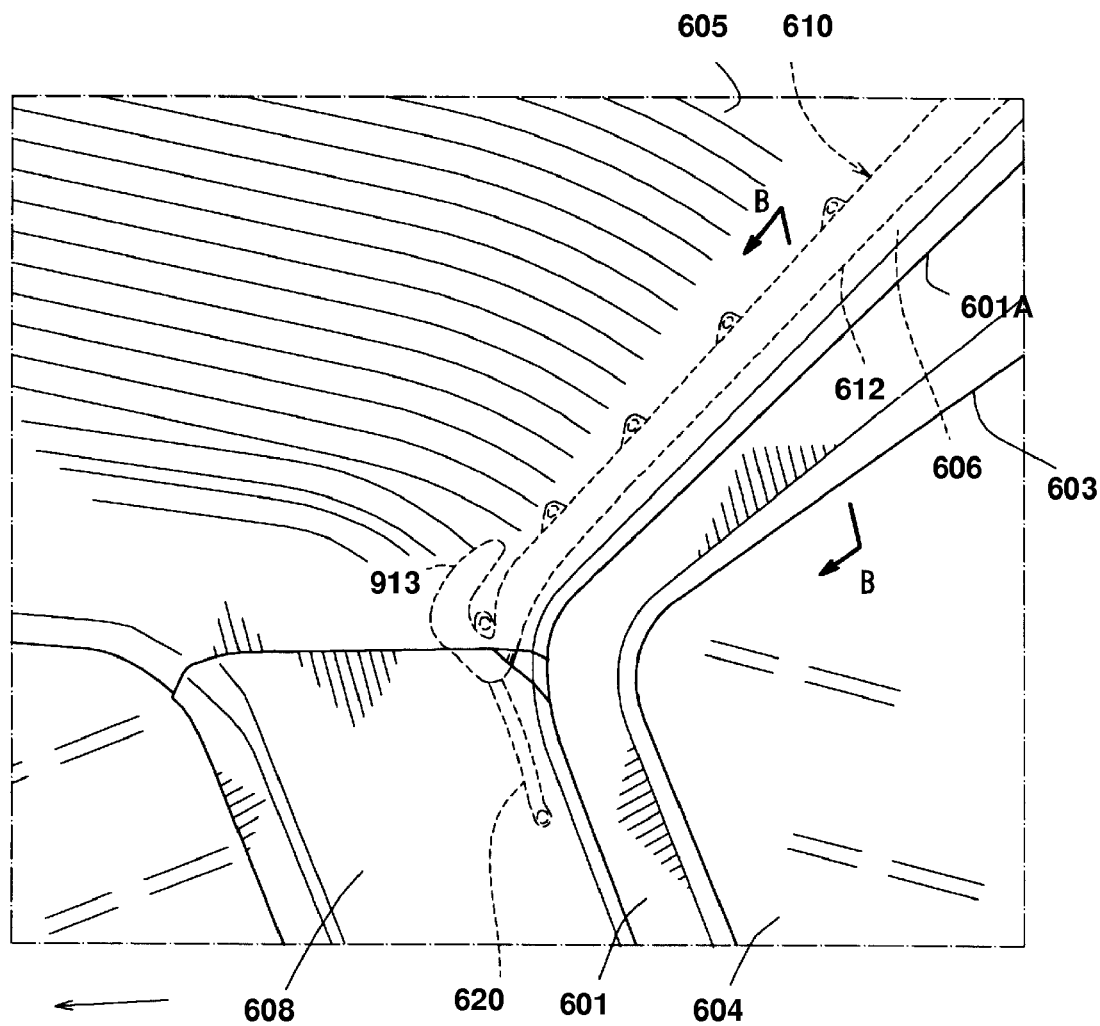
FIG. 30 is a perspective view of a rear upper portion of the vehicle compartment which shows a bending portion of a curtain member primarily according to a ninth embodiment.

A ninth embodiment will be described referring to FIG. 30. FIG. 30 is a perspective view of a rear upper portion of the vehicle compartment which shows a bending portion of a curtain member primarily according to the ninth embodiment. Herein, the same structure elements as those of the sixth embodiment are denoted by the same reference characters, and those detailed descriptions will be omitted.

According to the ninth embodiment, a bending portion 913 of the curtain member 610 in the stored state is turned back toward the body portion 612 so as to be provided along the upper edge 606 of the back-door opening 601A. Specifically, the bending portion 913 is provided so as to be directed inward so that it is positioned above the body portion 612 of the curtain member 610. Herein, the rear seat 602 is positioned closer to the back door 601 than that in the above-described six embodiment, which is not illustrated. Accordingly, since the bending portion 913 is not disposed forward of the vehicle, the bending portion 913 does not inflate forward greatly when the curtain member 610 inflates. Thus, a strong interference of the head of the passenger seated in the rear seat 602 with the curtain member 610 can be prevented properly. Accordingly, the curtain member 610 can be made inflate to improve the safety against the vehicle collision even in case the passenger is seated in the rear seat 602 close to the vehicle body.

In correspondence of the present invention to the above-described sixth through ninth embodiments, the deformation-restraint means the notch portion 660, the rear half part 708A, or the slit 826, and part of the curtain member corresponds to the bend portion 614, 814.

The present invention should not be limited to the above-described embodiments, and any other modifications and improvements may be applied within the scope of a spirit of the present invention.

What is claimed is:

1. An interior structure of a vehicle equipped with a curtain airbag, comprising:
    a roof trim provided to form a ceiling portion of a vehicle compartment below a roof panel;
    a pillar trim provided to cover a vertically-extending vehicle-body pillar from an inside of the vehicle compartment and extend vertically, the pillar trim being made from synthetic resin;
    a vehicle-body opening provided beside the vertically-extending vehicle-body pillar, an upper edge of which is positioned near an outer end portion of the roof trim; and
    a curtain-airbag means provided to be fixed to a vehicle body along the upper edge of the vehicle-body opening, the curtain-airbag means including a curtain member which has an inflatable portion to be inflated by gas supplied, the curtain member inflating into the vehicle compartment from a folded stored state, deforming the roof trim, so as to cover the vehicle-body opening when the gas is supplied into the inflatable portion on a specified condition,
    wherein said curtain member has a bending portion near the vertically-extending vehicle-body pillar in the folded stored state, the bending portion being formed by a rear portion of the curtain member in the folded stored state being bent forward, toward an opposite side to the vertically-extending vehicle-body pillar, and there is provided a connecting member which has a front end portion fixed to a specified portion of the curtain member and a rear end portion fixed to a specified portion of the vertically-extending vehicle-body pillar.

2. The interior structure of a vehicle equipped with a curtain airbag of claim 1, wherein said specified portion of the curtain member to which said front end portion of the connecting member is fixed is located forward, on the opposite side to the vertically-extending vehicle-body pillar relative to a bend position of said bending portion of the curtain member when the curtain member inflates.

3. The interior structure of a vehicle equipped with a curtain airbag of claim 2, wherein said specified portion of the curtain member is located near said bend position.

4. An interior structure of a vehicle equipped with a curtain airbag, comprising:
- a roof trim provided to form a ceiling portion of a vehicle compartment below a roof panel;
- a pillar trim provided to cover a vehicle-body pillar from an inside of the vehicle compartment and extend vertically, the pillar trim being made from synthetic resin;
- a vehicle-body opening provided beside the vehicle-body pillar, an upper edge of which is positioned near an outer end portion of the roof trim; and
- a curtain-airbag means provided to be fixed to a vehicle body along the upper edge of the vehicle-body opening, the curtain-airbag means including a curtain member which has an inflatable portion to be inflated by gas supplied, the curtain member inflating into the vehicle compartment from a stored state thereof, deforming the roof trim, so as to cover the vehicle-body opening when the gas is supplied into the inflatable portion on a specified condition, wherein said curtain member has a bending portion near the vehicle-body pillar in the stored state, the bending portion being formed so as to bend toward a specified side, and there is provided a connecting member which connects a specified portion of the curtain member to a specified middle portion of the vehicle-body pillar or connects two separate specified portions of the curtain member, said bending portion bends toward an opposite side to the vehicle-body pillar or toward the vehicle compartment, and said connecting member connects the specified portion of the curtain member to a specified lower-side position of the vehicle-body pillar, and said connecting member is configured to be located on a vehicle-body outward side relative to the curtain member when the curtain member inflates.

* * * * *